US006975245B1

(12) United States Patent
Slater et al.

(10) Patent No.: US 6,975,245 B1
(45) Date of Patent: Dec. 13, 2005

(54) REAL-TIME DATA ACQUISITION AND TELEMETRY BASED IRRIGATION CONTROL SYSTEM

(75) Inventors: John M. Slater, Idaho Falls, ID (US); John M. Svoboda, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 596 days.

(21) Appl. No.: 09/665,229

(22) Filed: Sep. 18, 2000

(51) Int. Cl.[7] .............................................. B05B 12/00
(52) U.S. Cl. ................. 340/870.16; 239/63; 340/10.34
(58) Field of Search ........................... 340/870.16, 7.2, 340/10.1, 310.07, 10.3; 324/663, 664; 700/284; 137/78.3, 78.2, 78.1; 455/26.1

(56) References Cited

U.S. PATENT DOCUMENTS

| | | | | |
|---|---|---|---|---|
| 4,209,131 | A * | 6/1980 | Barash et al. | 239/68 |
| 4,396,149 | A * | 8/1983 | Hirsch | 239/63 |
| 4,662,563 | A * | 5/1987 | Wolfe, Jr. | 239/1 |
| 4,683,904 | A * | 8/1987 | Iltis | 137/78.3 |
| 4,903,031 | A * | 2/1990 | Yamada | 342/359 |
| 4,909,070 | A * | 3/1990 | Smith | 73/73 |
| 5,053,774 | A * | 10/1991 | Schuermann et al. | 340/10.34 |
| 5,207,380 | A * | 5/1993 | Harryman | 239/64 |
| 5,239,203 | A | 8/1993 | Thorngren | 307/116 |
| 5,337,957 | A * | 8/1994 | Olson | 239/63 |
| 5,749,521 | A | 5/1998 | Lattery | 239/64 |
| 5,927,603 | A * | 7/1999 | McNabb | 239/63 |

* cited by examiner

*Primary Examiner*—Michael Horabik
*Assistant Examiner*—Hung Dang
(74) *Attorney, Agent, or Firm*—Trask Britt PC

(57) ABSTRACT

A data acquisition and telemetry based control system for use in facilitating substantially real time management of an agricultural irrigation system. The soil moisture sensor includes a reader and a plurality of probes. The probes each include an electronic circuit having a moisture sensing capacitor in operative communication with the soil whose moisture is to be measured. Each probe also includes a receive/transmit antenna and the reader includes a transmit/receive antenna, so that as the reader passes near the probe, the reader transmits a digital excitation signal to the electronic circuit of the biodegradable probe via an inductive couple formed between the transmit/receive antenna of the reader and the receive/transmit coil of the probe. The electronic circuit uses an energy component of the excitation signal to generate a digital data signal which indicates the moisture content of the soil adjacent to the moisture sensing capacitor. The probe sends the data signal to the reader which then uses the data signal to develop a corresponding set of watering instructions which are then transmitted to a control module in communication with the irrigation system. The control module sends corresponding control signals to nozzles of the irrigation system causing the irrigation system to disperse water in a manner consistent with the moisture content data transmitted by the probes to the reader. Because the irrigation system moves continuously through the field to be irrigated, the moisture content data acquisition and resultant water dispersal by the irrigation system occur substantially in real time.

61 Claims, 11 Drawing Sheets

REAL-TIME DATA ACQUISITION AND TELEMETRY BASED IRRIGATION CONTROL SYSTEM

CONTRACTUAL ORIGIN OF THE INVENTION

The United States Government has certain rights in this invention pursuant to Contract Nos. DE-AC07-94ID13223, DE-AC07-99ID13727, and Contract No. DE-AC07-05ID14517 between the United State Department of Energy and Battelle Energy Alliance, LLC.

BACKGROUND OF THE INVENTION

1. Field of the Invention

The present invention relates generally to methods and devices for facilitating real time management of an object system. More particularly, embodiments of the present invention relate to a data acquisition and telemetry control system for facilitating substantially real-time control of automated irrigation systems.

2. Prior State of the Art

It is generally acknowledged that the availability of water for agricultural applications is becoming an ever-increasing problem. The relative scarcity of water has obvious negative consequences. For example, because the water is relatively scarce, the price that is charged for the water that is available is relatively higher. This is in accord with basic economic principles. Furthermore, it is a natural consequence of higher water prices that the crops that are produced with that water will be more expensive, therefore increasing the end cost to consumers for those agricultural products.

A variety of factors affect the supply of water used in agricultural applications. Some factors, such as weather, are essentially uncontrollable. However, one of the most significant, controllable, factors affecting the supply of agricultural water is the general tendency of farmers to over-irrigate their crops. This problem is particularly acute where farmers irrigate with center pivot irrigation systems. Some experts have estimated that farmers using center pivots disperse up to thirty percent more water than is necessary to support the development of the crop.

As suggested earlier, over-irrigating has economic consequences in that it tends to reduce the overall water supply, and thus increase water costs. In addition to reducing the overall water supply however, over-irrigating may also damage crops. For example, some experts have noted that over-irrigating of potatoes tends to promote disease, and reduce potato size and quality. There are other problems associated with over-irrigating as well. In particular, farmers realize a significant outlay in costs associated with pumping the water to and onto the agricultural fields. Over-use of water naturally increases pumping costs to the farmer.

Clearly, over-irrigation has a variety of undesirable consequences, and yet the practice continues. There are a variety of reasons for this. One of the reasons for over-irrigation is that many farmers lack an economic incentive to do otherwise. For example, the state of Idaho has over one million acres served by center pivot irrigation systems. However, many farmers there own water shares and thus the water is relatively inexpensive. Accordingly, those farmers have little economic incentive to conserve water, and thus tend to use more water than they actually need.

Another reason for over-irrigation relates to the fact that the typical farmer's watering scheme is essentially empirical in nature. It is generally acknowledged that rates of water absorption and retention may vary widely throughout an agricultural field. However, the farmer is forced to take a worst case approach and over-irrigate rather than under-irrigate so as to ensure that those portions of the agricultural field that use water most quickly are adequately watered and retain adequate moisture to support crop development. Thus, because the farmer lacks any way to precisely determine the differing water requirements of the various portions of the agricultural field, and to disperse water accordingly, the farmer is forced to err on the side of over-irrigating rather than under-irrigating.

As suggested in the foregoing discussion, one of the major factors contributing to the scarcity of agricultural water is the tendency of farmers to over-irrigate their crops. The major reason for over-irrigating is that farmers have no reliable, contemporaneous, method or device to determine the moisture content throughout their fields. Farmers would be able to much more readily control their water consumption, and associated pumping costs, if they had a relatively inexpensive system and/or device which could determine moisture content throughout the entire agricultural field and then communicate that data to an irrigation control system. The benefits of such a system or device would include increased water availability, reduced water costs, and improved crop quality.

While systems exist wherein desired data is communicated or transmitted to some type of transmitter/receiver, those systems are inadequate to solve the problems identified herein. In particular, these systems typically involve transmission of data that has been embedded in a computer chip or the like. When a signal from the transmitter/receiver impinges upon the chip, the chip transmits the embedded, or pre-programmed, data back to the transmitter/receiver. However, these systems are inadequate to solve the problems discussed herein because they suffer from the significant limitation that they cannot acquire data, rather they simply transmit data that has already been pre-programmed.

Other known systems are capable of acquiring and then transmitting data. However, these systems have limitations as well. A typical system employs a plurality of sensors disposed in a particular environment so as to measure one or more parameters of interest with respect to the environment. Upon interrogation by a transmitter/receiver, the sensors acquire the desired data and transmit it to the transmitter/receiver. The major shortcoming of such systems is that the sensors typically require a power source such as a battery or the like, in order to acquire and then transmit data. Thus, such sensors are of limited utility where replacement of the power source is impossible or impracticable. Furthermore, power sources such as batteries are sensitive to temperature extremes and other environmental influences that may compromise their performance or render them ineffective. The problems associated with battery powered sensors and the like are further exacerbated in those situations where a plurality of sensors are deployed. Finally, these types of systems typically only gather and process data, they do not include substantially real-time system control functionality.

It will be appreciated that, due to changing environmental, soil, and crop conditions, the moisture content of an agricultural field may vary greatly with the passage of time and according to different locations in the field. Due to the inherently dynamic nature of the moisture content of a particular environment, any system or device for measuring moisture content and transmitting moisture content data must be able to do so continuously and reliably. Known systems lack the functionality to meet these performance requirements.

In view of the foregoing problems with known irrigation methods and devices, what is needed is a soil moisture sensor capable, upon demand, of measuring moisture content of an area of interest, and transmitting the acquired moisture content data to a data collection point. The soil moisture sensor should be able to process the collected moisture content data to generate a moisture map. Further, the soil moisture sensor should be able to continuously and contemporaneously update the moisture map. Additionally, the soil moisture sensor should be able to communicate the moisture map to an irrigation control system so as to facilitate substantially real-time irrigation system control. Finally, the soil moisture sensor should be relatively inexpensive and easy to maintain.

SUMMARY OF THE INVENTION

The present invention has been developed in response to the current state of the art, and in particular, in response to these and other problems and needs that have not been fully or completely solved.

Thus, it is an overall object of the present invention to provide a soil moisture sensor that resolves at least the aforementioned problems and shortcomings in the art.

It is another object of one embodiment of the present invention to provide a soil moisture sensor that employs moisture content data to generate, and periodically update, a moisture map of an agricultural field.

Finally, it is an object of one embodiment of the present invention to provide a soil moisture sensor that operates in conjunction with an irrigation control system so as to facilitate substantially real-time development and implementation of an irrigation plan for an agricultural field.

In summary, the foregoing in other objects, advantages, and features are achieved with an improved soil moisture sensor for use in contemporaneously determining moisture content of various portions of the agricultural field. Embodiments of the present invention are particularly suitable for use in facilitating precise irrigation of agricultural fields by center pivot and linear move irrigation systems.

In a preferred embodiment, the improved moisture sensor includes a reader capable of operative communication with one or more probes. Preferably, each of the probes includes a biodegradable body substantially composed of cardboard or the like, so as to minimize expense and to preclude the need for recovery of the probes at the end of the growing season. Each probe employs circuitry that requires no internal power source for operation, rather, as described below, the probe receives its power via an inductive couple established between the probe and an energy source, or reader. Preferably, the circuitry comprises digital electronics. The digital electronics of the probes include a moisture sensitive capacitor disposed so as to be in operative contact with that portion of the agricultural field whose moisture content is to be monitored.

In operation, the reader selectively emits an excitation signal, preferably comprising both data and energy components, that is received by a probe receiver/transmitter when the reader passes within a predetermined distance of the probe. Preferably, the probe receiver/transmitter comprises a tuned circuit antenna so as to facilitate maximization of energy exchange with the reader. The excitation signal is passed within the probe receiver/transmitter to a system processor which, in turn, is in operative communication with the moisture sensitive capacitor. The digital output, or data, from the system processor serves to indicate the moisture content detected by the moisture sensitive capacitor. This digital data is then transmitted to the reader via the probe receiver/transmitter, and is received by the reader receiver/transmitter. As with the probe receiver/transmitter, the reader receiver/transmitter preferably comprises a tuned circuit antenna. Upon receiving the digital data transmitted by the probe(s), the reader feeds the digital moisture content data to a control module in operative communication with an irrigation system so as to facilitate substantially real-time control of field irrigation.

These and other objects, features, and advantages of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention and its presently understood best mode for making and using the same will be described and explained with additional specificity and detail through the use of the accompanying drawings in which.

DETAILED DESCRIPTION OF THE PREFERRED EMBODIMENTS

The agriculture industry, like many other industries, is becoming more sensitive to economic pressures. The misuse of resources can lead to higher costs, which in turn lead to lower profits. These economic pressures are addressed, in part, by focusing on systems and methods for not only reducing cost, but also increasing production and profitability. In particular, a significant cost faced by the agriculture industry is the cost of water. Not only does water have a monetary cost, but the ineffective use of water ultimately has detrimental effects on the yield and profitability of the crop being cultivated.

Irrigating a crop with too much water has a negative economic impact. For example, irrigating potatoes with too much water promotes disease, reduces potato quality, decreases potato size, increases storage cost and can lead to nitrogen leaching which increases fertilizer costs. Similarly, irrigating with too little water has a negative economic impact. The present invention is directed towards methods and systems than permit a particular agricultural field to be irrigated with an appropriate amount of water at the appropriate time. Frequently, the amount of irrigation is dependent on current water content of the field being irrigated. The present invention is described in terms of a center pivot irrigation system, but can apply to other irrigation systems as well as situations where water content or other fluid content is to be measured.

Reference will now be made to figures wherein like structures will be provided with like reference designations. It is to be understood that the drawings are diagrammatic and schematic representations of various embodiments of the invention, and are not to be construed as limiting the present invention.

In general, the present invention relates to an improved soil moisture sensor having data acquisition and telemetry functionality for use in determining moisture content of agricultural fields, and in employing the moisture content data to facilitate substantially real-time control of an irrigation system. FIGS. 1 through 6 indicate various embodiments of a moisture sensor conforming to the teachings of the invention.

Figure 1:
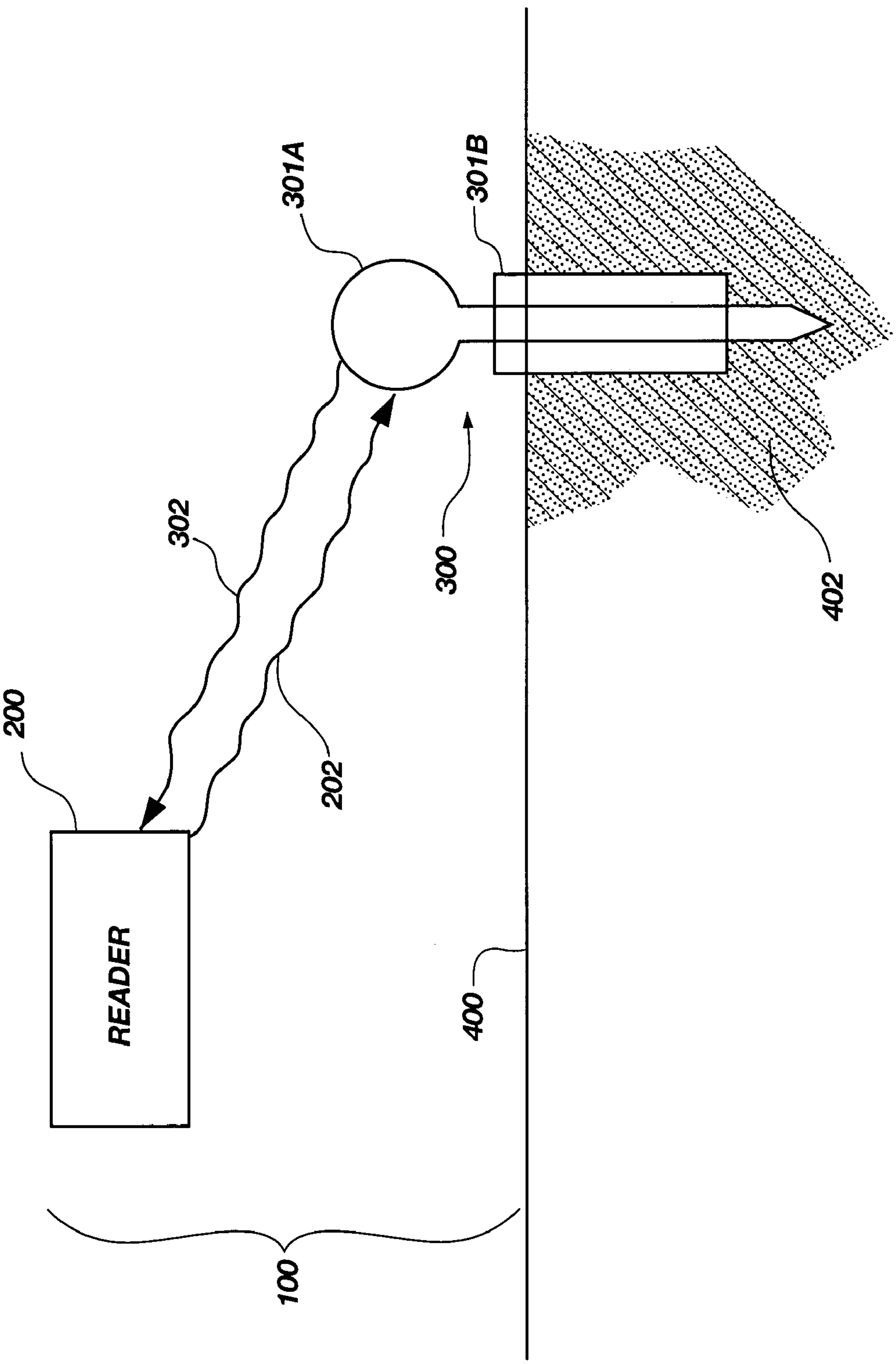
FIG. 1 is a general arrangement schematic showing one embodiment of a soil moisture sensor, and indicating generally the relation between the reader and the probe.

Reference is first made to FIG. 1 which depicts one embodiment of the present invention. The soil moisture sensor is depicted generally as 100 and includes, among other things, a data acquisition function to measure the moisture content of the soil, and telemetry function wherein the moisture content data is transmitted and analyzed. Soil moisture sensor 100 comprises a reader 200 and at least one probe 300. In a preferred embodiment, a plurality of probes 300 are disposed throughout agricultural field 400, or other zone of interest, so as to be in contact with soil 402. While FIG. 1 indicates an arrangement wherein a portion of probe 100 protrudes from soil 402, other arrangements are contemplated wherein probe 100 is buried completely beneath the surface of soil 402, as required to suit a particular application and/or probe configuration.

Data relating to spatial location of the probes is collected and saved for future processing at the time the probes are placed. This enables later generation of moisture maps of various portions of the geographical area in which the probes were placed. Additionally, the amount of water dispersed on different portions of an agricultural field may be varied based on different readings from the various probes. The location data may be stored in the reader 200 or a remote site 600.

As further indicated in FIG. 1, one embodiment of probe 300 includes a body 301A supported by stiffener tube 301B. In one embodiment, body 301A is substantially biodegradable and comprises cardboard or the like so as to facilitate production of an inexpensive probe 300 and to preclude the need for recovery of probes 300 at the end of the growing season.

The operation of soil moisture sensor 100 proceeds generally as follows. When reader 200 passes within a predetermined distance of probe 300, reader 200 transmits excitation signal 202 which is incident upon probe 300. Probe 300 is in operative communication with reader 200 so that probe 300 collects energy from excitation signal 202 and stores that energy for future use. As discussed in greater detail elsewhere herein, it will be appreciated that excitation signal 202 may also include data, including, but not limited to, instructions for probe 300. Probe 300 then uses the energy thus stored to gather moisture content data from soil 402 and transmit that moisture content data, in the form of a data signal 302, to reader 200. It is thus an important feature of the present invention that probe 300 requires no internal power source. Rather, due to an inductive coupling established between reader 200 and probe 300, all of the energy required to perform the data acquisition and transmission functions of probe 300 is supplied by reader 200 via the inductive coupling. After data signal 302 is received by reader 200, reader 200 stores the digital data from data signal 302. The moisture content data thus acquired may be employed to facilitate real-time control of a field irrigation system, wherein the amount of water dispensed on various parts of agricultural field 400, as well as the time(s) at which the water is dispensed, are determined with reference to the moisture content data. Alternatively, the moisture content data may be used to generate a moisture map of agricultural field 400. Note that, as contemplated herein, "moisture" refers generally to liquids and various combinations thereof, including, but not limited to, water. Note further that soil 402 is but one example of a medium of interest whose parameters could profitably be measured and/or monitored by embodiments of the present invention. As discussed elsewhere herein, the measured values of those parameters may be employed in variety of different ways.

The functionality provided by probe 300 can be achieved in a variety of different ways. For example, the electronic circuit 303 (see FIG. 2A, for example) utilized in probe 300 could be either digital or analog. Note that, as discussed in further detail below, the meaning of "electronic circuit" contemplated by the present invention includes, but is not limited to, circuits employing signal processing and/or power transmission functionality. Further, it is contemplated that such electronic circuits may comprise digital or analog elements, or combinations thereof.

With continuing reference now to probe 300, probe 300 may employ an "active" mode of operation wherein probe 300 is capable of storing energy received from reader 200 and then transmitting a data signal 302 to reader 200 at a substantially different frequency, and time, than that of excitation signal 202. An alternative embodiment of probe 300 may employ a "passive" mode of operation, wherein no energy is stored, and data signal 302 is transmitted to reader 200 at substantially the same frequency or harmonic as that of excitation signal 202. Note however, that any device or system having the functionality of probe 300, as disclosed herein, is contemplated as being within the scope of the present invention.

Figure 2A:
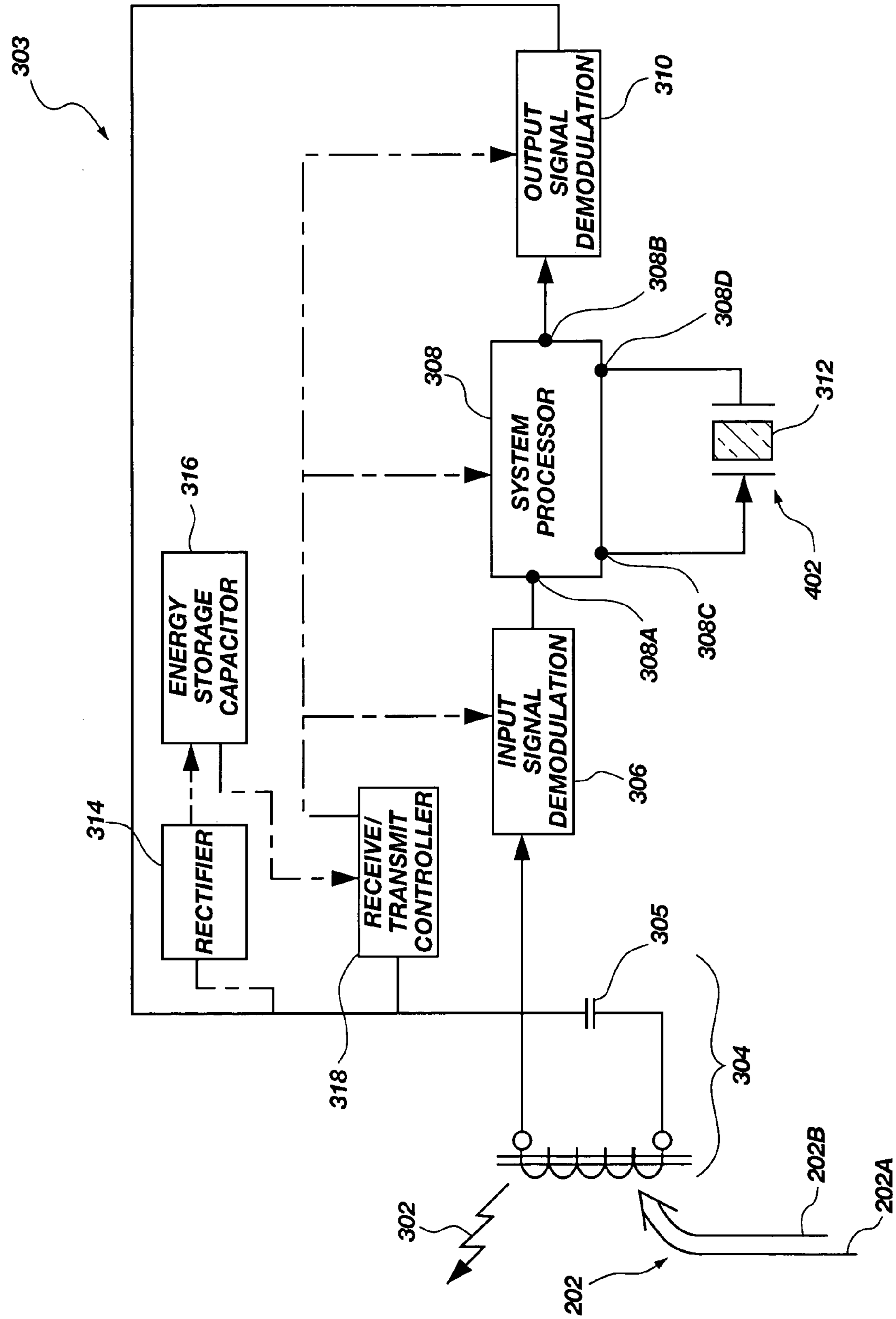
FIG. 2A is a block diagram of one embodiment of an active style probe employing digital electronics, and indicating relationships among various elements of the probe.
Figure 2B:
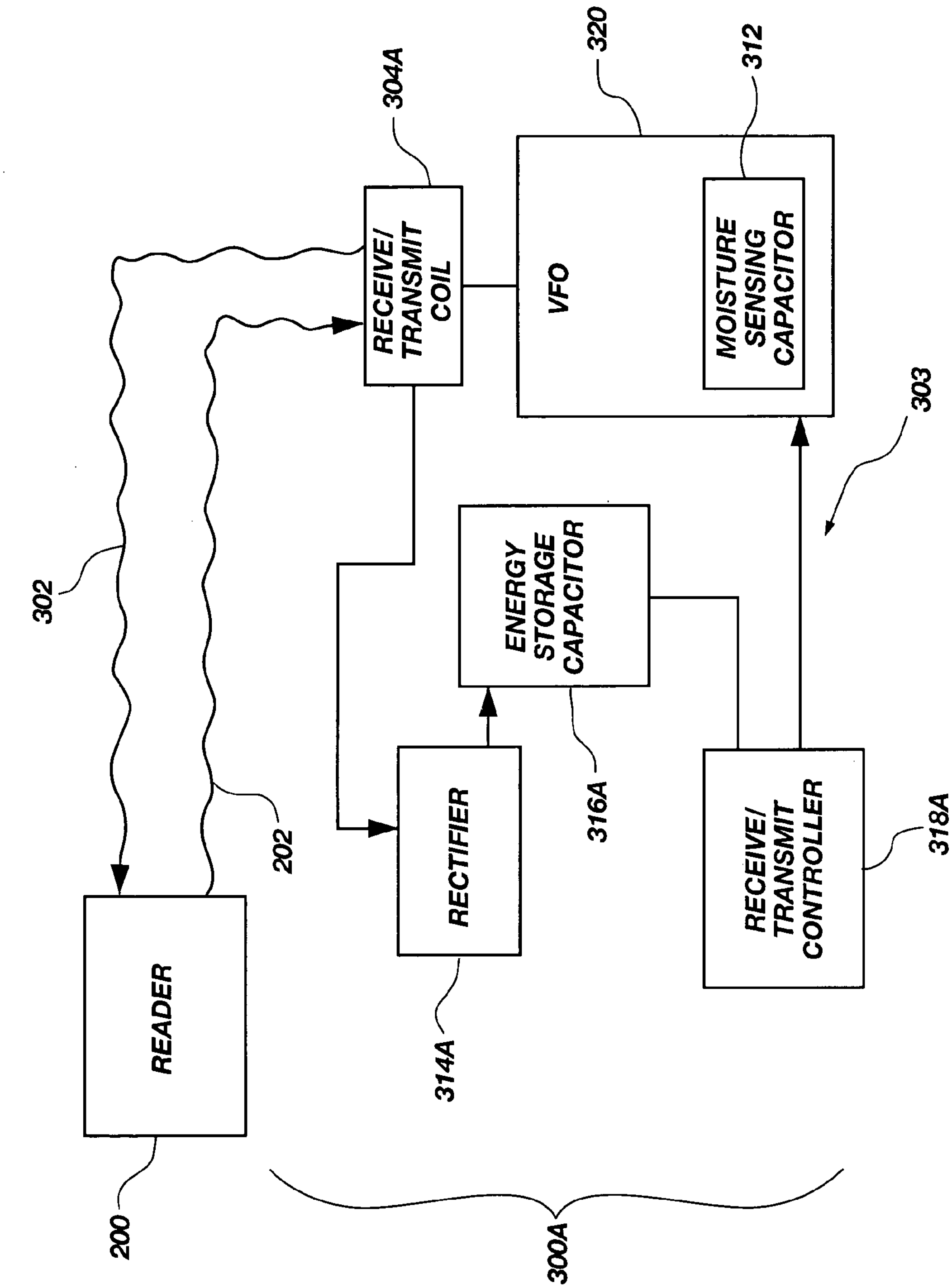
FIG. 2B is a block diagram of an embodiment of an active style probe employing analog electronics, and indicating relationships among various elements of the probe.

A preferred embodiment of probe 300 is depicted in FIG. 2A in block diagram form. In general, electronic circuit 303 of probe 300 is preferably digital and includes a power transmission element (generally indicated in phantom lines) and a signal processing and transmission element (generally indicated in solid lines). However, the two elements may in some instances be interconnected so that the portion of the circuit represented by a particular solid line or phantom line in FIG. 2B may, at different instances, serve to transmit power as well as facilitate signal processing and transmission.

As indicated in FIG. 2A, this embodiment of probe 300 includes a probe transmit/receive antenna 304 having a capacitor 305. Preferably, probe transmit/receive antenna 304 comprises a tuned circuit, antenna, i.e., a resonant antenna, or the like. Note that because probe receive/transmit antenna 304 is preferably sensitive to, and generates, a B-field, it does not radiate to an extent that would interfere with other radio frequency (RF) services.

Figure 4A:
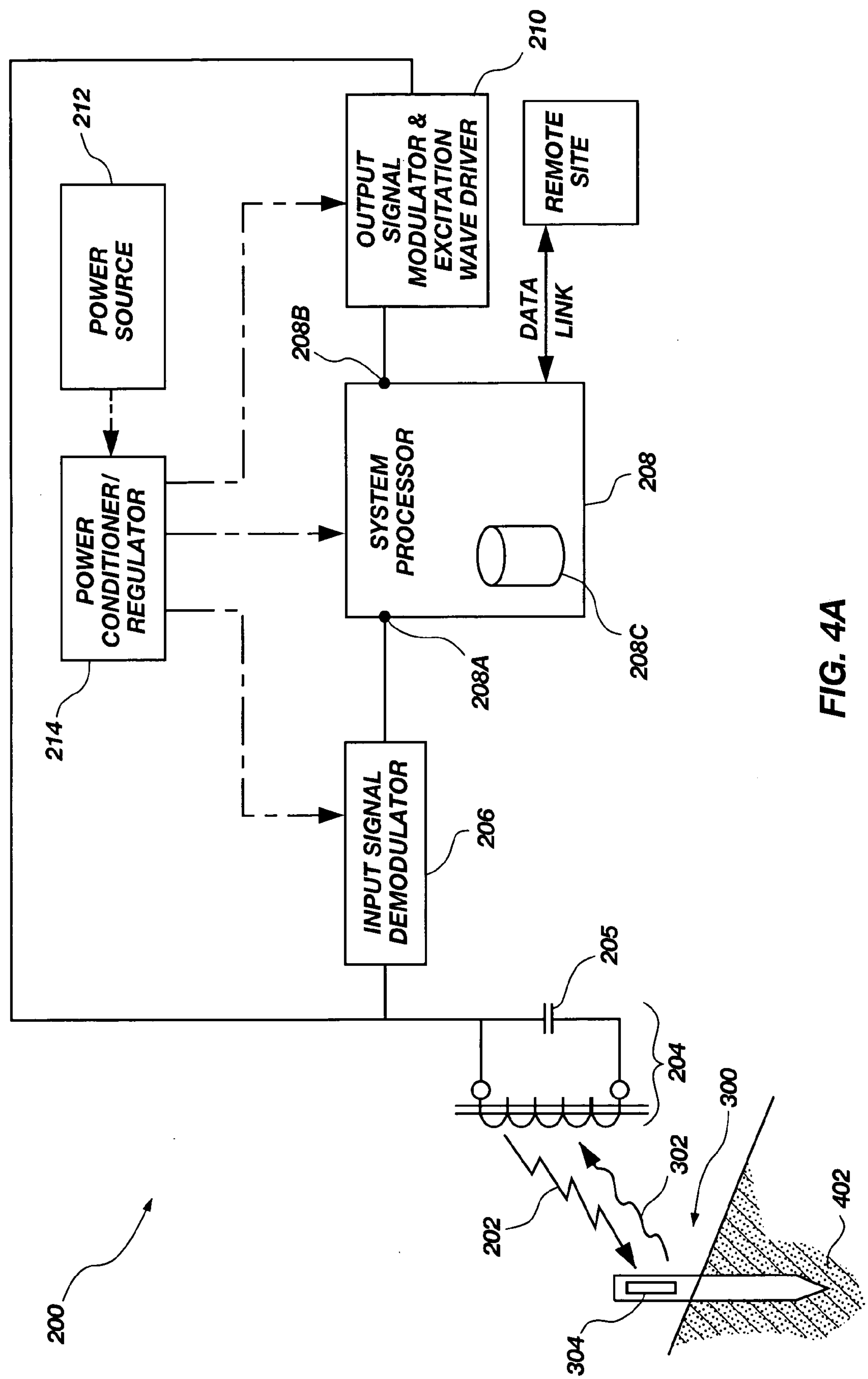
FIG. 4A is a block diagram of one embodiment of a reader employing digital electronics, indicating the relationships among the various elements of the reader.
Figure 4B:
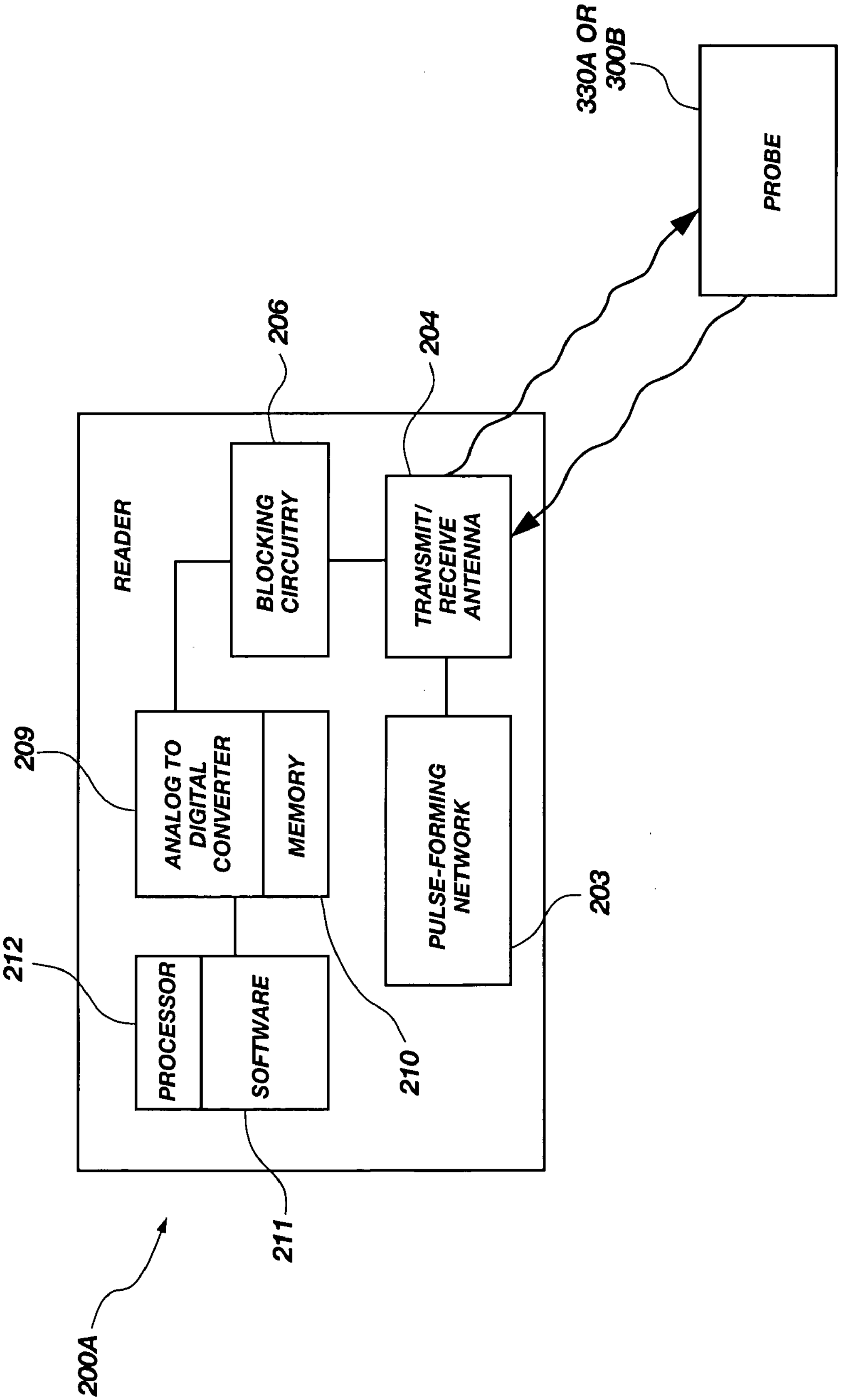
FIG. 4B is a block diagram of one embodiment of a reader employing analog electronics, indicating the relationships among the various elements of the reader.

It will be appreciated that a variety of means may be profitably employed to perform the receive and transmit functions of probe transmit/receive antenna 304 and reader transmit/receive antenna 204 (see FIGS. 4A and 4B). Probe transmit/receive antenna 304 and reader transmit/receive antenna 204, respectively, are but examples of means for receiving and transmitting signals. Thus, the circuits disclosed herein simply represent embodiments of circuits capable of performing these functions. It should accordingly be understood that these circuits are presented solely by way of example and should not be construed as limiting the present invention in any way. An alternate example of means for receiving and transmitting signals comprises transmit/receive coils such as B-field generators, and the like.

As discussed in further detail below, probe transmit/receive antenna 304 facilitates establishment of an inductive couple between reader 200 (not shown) and probe 300. Electronic circuit 303 additionally includes an input signal demodulator 306 in communication with a system processor 308. Specifically, system processor 308 includes an input 308A to which input signal demodulator 306 is connected, and an output 308B connected to output signal modulator 310. Preferably, input signal demodulator 306 and output signal modulator 310 are adapted for frequency demodulation and modulation (FM), respectively. However, in an alternative embodiment, input signal demodulator 306 and output signal modulator 310 are adapted for amplitude demodulation and modulation (AM), respectively.

With continuing reference to FIG. 2A, system processor 308 additionally includes a drive output 308C and a sense input 308D, between which is connected a moisture sensing capacitor 312. As discussed elsewhere herein, there are a variety of configurations that will provide the functionality of moisture sensing capacitor 312. Moisture sensing capacitor 312, in turn, is in operative communication with soil 402. Finally, electronic circuit 303 includes a rectifier 314 connected to probe transmit/receive antenna 304 and to energy storage capacitor 316. Energy storage capacitor 316, in turn, is connected to receive/transmit controller 318. Note that probe 300 may be inserted into soil 402 so that only probe transmit/receive antenna 304 remains exposed, alternatively, probe 300 may be buried completely underneath the surface of soil 402.

In operation, radio frequency (RF) energy is emitted by reader 200 (not shown) as excitation signal 202 and is received at probe 300. At electronic circuit 303, the incoming RF energy causes sufficient voltage to be built up there to produce a flow of alternating current (AC). In one embodiment, excitation signal 202 comprises at least two components, a data component 202A and an energy component 202B. In an alternative embodiment, excitation signal 202 consists primarily of an energy component 202B.

Data component 202A preferably comprises a frequency modulated (FM) carrier wave, but may alternatively comprise an amplitude modulated (AM) carrier wave. Note that the present invention contemplates as within its scope data components 202A modulated in other ways as well, such as by phase shifting. The present invention also contemplates as within its scope data components 202A modulated in more than one way, for example, a data component 202 modulated with respect to both amplitude and phase. Generally, data component 202A comprises various desired instructions from reader 200 to probe 300. Exemplary instructions include guidance as to when probe 300 should transmit data back to reader 200, how often probe 300 should transmit data to reader 200, or whether probe 300 should report diagnostic information.

With continuing reference to FIG. 2A, excitation signal 202 impinges upon probe transmit/receive antenna 304. Energy from energy component 202B is built up in capacitor 305, in the form of a potential difference, until such time as sufficient energy is stored to put rectifier 314 into operation. When rectifier 314 is thus activated, it serves to rectify, or convert, the incoming AC current, received by probe transmit/receive antenna 304, into direct current (DC) which is then used to charge energy storage capacitor 316 to a predetermined voltage.

After energy storage capacitor 316 has been charged to the predetermined voltage, preferably about five (5) volts, and energy component 202B has ceased to be transmitted, these conditions are sensed by the receive/transmit controller 318 which then switches from 'receive' mode to 'transmit' mode. In particular, receive/transmit controller 318 allows current to flow from energy storage capacitor 316 to system processor 308 and output signal modulator 310. In the event excitation signal 202 includes a data component 202A, receive/transmit controller 318 allows power to flow from energy storage capacitor 316 to input signal demodulator 306 as well.

The power stored in energy storage capacitor 316 and subsequently released by way of receive/transmit controller 318 is used for several different purposes. First, in the case where excitation signal 202 includes a data component 202A, power from energy storage capacitor 316 is used to energize input signal demodulator 306 so that input signal demodulator 306 is able to demodulate the modulated data signal 202A prior to reception by system processor 308. Preferably, the output from input signal demodulator 306 to system processor 308 comprises a digital data signal carrying particular instructions for system processor 308 relating to the gathering and/or transmission of moisture content data.

Energy storage capacitor 316 also provides power to energize system processor 308. Upon being energized, system processor 308 sends a drive signal from drive output 308C to moisture sensing capacitor 312 which, in response, acquires soil 402 moisture content data. As discussed elsewhere herein, one embodiment of moisture sensing capacitor 312 comprises a hydrophilic dielectric which absorbs moisture to a level consistent with the surrounding soil 402, so that the response of moisture sensing capacitor 312 to the drive signal produced by system processor 308 is an analog waveform representing the moisture content of soil 402 in the vicinity of moisture sensing capacitor 312. This arrangement also provides a way to measure the soil matrix water potential if the relationship between the water content and potential are known for the particular dielectric. Moisture sensing capacitor 312 thus serves as a sensor of variable capacitance that, when energized, exhibits a capacitance that is characteristic of one or more parameters of the medium to which the moisture sensing capacitor 312 is exposed. The analog signal produced by moisture sensing capacitor 312 is then returned to system processor 308 by way of sense input 308D, whereupon system processor 308 converts the analog signal to a digital carrier signal.

The digital carrier signal thus produced by system processor 308 then passes to output signal modulator 310 for modulation preparatory to transmission of moisture content data to reader 200 (not shown). Note that, as contemplated herein, "modulation" refers to the general process whereby data is superimposed on a carrier signal, so as to form a data signal, by modification of one or more of the characteristics of the carrier signal, the aforesaid characteristics of the carrier signal including, but not limited to, phase, amplitude, and frequency. In similar fashion, "demodulation" refers to the extraction of data from a modulated signal.

In a preferred embodiment, output signal modulator 310 modulates at least the frequency of the digital carrier signal produced by system processor 308. Thus, the frequency of the carrier signal used to form data-signal 302 transmitted by probe 300 can be adjusted so as to be materially different than that of excitation signal 202. As discussed in greater detail below in the context of reader 200, this is a valuable feature because it allows reader 200 to transmit at frequencies substantially different from those at which it receives, thereby minimizing interference at reader 200 and improving reader 200 performance. Also, receive/transmit controller 318 preferably serves to ensure that data signal 302 will be transmitted at a materially different time than excitation signal 202. Finally, note that one or more of the operations of system processor 308 may be performed in response to instructions carried by a data component 202A of excitation signal 202.

While frequency modulation is one way to modulate the digital carrier signal produced by signal processor 308, so as to produce data signal 302, it will be appreciated that various other parameters of the digital carrier signal, including, but not limited to, phase and amplitude, may be modulated as well by output signal modulator 310, either alone or in various combinations. Such modulation is accordingly contemplated as being within the scope of the present invention. Data signal 302 is then transmitted to reader 200 by way of probe transmit/receive antenna 304.

As suggested earlier, an alternative embodiment of an "active" mode probe 300 employs analog circuitry. One such embodiment is indicated generally as 300A in FIG. 2B. In particular, electronic circuit 303 of probe 300A includes a receive/transmit coil 304A, and a variable frequency oscillator (VFO) 320 having a moisture sensing capacitor 312 which serves to control the frequency at which VFO 320 oscillates. Receive/transmit coil 304A preferably comprises an inductive loop or the like so that, in operation, probe 300A is inductively coupled to reader 200 via receive/transmit coil 304A. As further indicated in FIG. 2B, electronic circuit 303 also comprises a rectifier 314A, an energy storage capacitor 316A, and a receive/transmit controller 318A.

In operation, reader 200 passes within a predetermined distance, preferably about ten (10) feet, of probe 300A and transmits excitation signal 202 which impinges upon probe receive/transmit coil 304A. Note that in this embodiment, excitation signal 202 is primarily composed of energy component 202B, and does not include a data component 202A. Excitation signal 202 preferably comprises RF energy. As a result of the transmission of excitation signal 202 by reader 200, a voltage is gradually developed in probe receive/transmit coil 304A so that a flow of AC current is produced which flows to rectifier 314A. The flow of AC current is converted to DC current by rectifier 314A, and the DC current then serves to charge energy storage capacitor 316A. Over the course of many cycles of excitation signal 202, the voltage across energy storage capacitor 316A builds up to a predetermined level, preferably about five (5) volts, but in any event, a voltage level adequate to facilitate the data gathering and data transmission functions of probe 300A.

When the voltage in energy storage capacitor 316A reaches the predetermined level, receive/transmit controller 318A switches electronic circuit 303 of probe 300A from 'receive' mode, wherein voltage is built up in energy storage capacitor 316A, to 'transmit' mode. In 'transmit' mode, energy storage capacitor 316A discharges, producing a flow of current that energizes VFO 320 and thereby causes VFO 320 to emit a signal of characteristic frequency, or oscillate. The signal thus produced is data signal 302. As previously noted, the frequency at which VFO 320 oscillates is controlled by moisture sensing capacitor 312. In particular, the capacitance of moisture sensing capacitor 312, which is a function of the moisture content of soil 402 to which moisture sensing capacitor 312 is exposed, determines the frequency at which VFO 320 oscillates. Data signal 302 transmitted by probe 300A in response to reception of excitation signal 202 transmitted by reader 200 thus has a frequency analogous to the moisture content of soil 402 in the vicinity of probe 300A.

One important feature of probe 300A then is the fact that it requires no internal energy supply to facilitate its data gathering and data transmission functions. Rather, the energy needed to make VFO 320 oscillate is provided by reader 200 via the inductive couple established between reader 200 and probe 300A. Another important feature of this embodiment of probe 300A is that rectifier 314A and energy storage capacitor 316A permit electronic circuit 303 to store a relatively large amount of energy with which to cause VFO 320 to oscillate. This large amount of stored energy permits VFO 320 to oscillate at a frequency substantially different than that of excitation signal 202 transmitted by reader 200. As a result, reader 200 is able to readily discern between excitation signal 202 transmitted by reader 200, and data signal 302 received by reader 200 from probe 300A. Further, reader 200 is able to readily receive data signal 302 because data signal 302 is relatively powerful. Finally, because energy must be gradually built up in energy storage capacitor 316A, data signal 302 is transmitted after excitation signal 202 has ceased. That is, there is a time delay between the time excitation signal 202 is transmitted and the time that data signal 302 is transmitted.

As previously noted, another alternative embodiment of probe 300 operates in a "passive" mode. This embodiment, designated in FIG. 2C as probe 300B, preferably employs an analog electronic circuit 303 comprising an inductor, in the form of probe receive/transmit coil 304A, and a moisture sensing capacitor 312 comprising capacitor plates 324 and a hydrophilic dielectric 328 disposed between the capacitor plates 324. The structure and operation of probe 300B are generally similar to that of the embodiment of probe 300 depicted in FIG. 2B except that probe 300B does not include an energy storage capability such as is provided by energy storage capacitor 316A of probe 300A (see FIG. 2B). Rather, probe receive/transmit coil 304A is energized directly by reader 200. Probe 300B thus requires that reader 200 transmit excitation signal 202 over a broad band so as to ensure that probe 300B is sufficiently energized to effect data acquisition and data transmission. Further, because probe 300B does not employ energy storage functionality, its analog circuit comprising probe receive/transmit coil 304A and moisture sensing capacitor 312 immediately resonates at substantially the same frequency or harmonic as that of excitation signal 202 transmitted thereto by reader 200. Additionally, the lack of energy storage functionality in electronic circuit 303 of probe 300B means that relatively little of excitation signal 202 provided by reader 200 is captured and returned by probe 300B. Hence, data signal 302 transmitted by probe 300B is somewhat less powerful than excitation signal 202 transmitted by reader 200.

Specific operational details of reader 200 are discussed in detail elsewhere herein. In general however, the data signal(s) 302 transmitted by probe 300 (or 300A or 300B, as applicable) are received by reader 200 and then processed either by reader 200, or at a remote site 600, to produce a moisture map of agricultural field 400 (not shown). After data signal 302 has been transmitted by the circuit comprising probe receive/transmit coil 304A and moisture sensing capacitor 312, receive/transmit controller 318 (or 318A in the case of probe 300A) switches that circuit back to 'receive' mode, thereby readying probe 300 (or an alternative embodiment thereof) to receive further transmission of excitation signal 202 from reader 200. As discussed in further detail below, the architecture of reader 200 may be varied as necessary to ensure cooperation with various embodiments of probe 300.

Finally, note that while the capacitance value (and thus the moisture content, or soil matrix water potential, of soil 402) can be thus 'encoded' so that the frequency of data signal 302 reflects the capacitance value, this invention contemplates as within its scope any other methods of encoding the capacitance value that would provide the functionality described herein, including, but not limited to, digitally encoding the capacitance value on data signal 302. One possible embodiment of such a digital arrangement is discussed in detail elsewhere herein.

Attention is directed now to a general discussion of the structure and operation of capacitors such as may be employed in the context of the present invention. As is well known, capacitors typically include two conductors electrically isolated from each other by a substantially non-conducting material, or dielectric. In general, the capacitance "C", or ability of the capacitor to hold a charge, is a function of the dielectric constant of the dielectric disposed between the plates of the capacitor. As the dielectric constant of a capacitor varies, the capacitance value of the capacitor, or signal produced by the capacitor upon discharge, will vary as well.

Typically, dielectrics comprise materials that do not materially change over time, thus, the dielectric constant corresponding to that material will likewise remain substantially unchanged over time. However, where the composition of the dielectric varies with time, the dielectric constant, and thus the capacitance of the capacitor, will vary over time as well. Accordingly, the capacitance of the capacitor is a function of the composition of the dielectric of the capacitor.

In the context of a probe 300 employing a digital electronic circuit 303 (one embodiment of which is depicted in FIG. 2A), the capacitance produced by moisture sensing capacitor 312 is, as discussed above, analogous to the moisture content of soil 402 in operative contact therewith. Thus, the conversion, by system processor 308 (see FIG. 2A), of the capacitance of the moisture sensing capacitor 312, and the subsequent modulation of that digital carrier signal by output signal modulator 310, results in a digital data signal 302 that indicates the moisture content of soil 402.

Where moisture sensing capacitor 312 is employed in a probe having analog circuitry (two embodiments of such a probe being depicted in FIGS. 2B and 2C, respectively), e.g. 300A and 300B, the effects of moisture sensing capacitor 312 may be appreciated by considering the relationship $f=\frac{1}{2}\times\Pi(LC)^{1/2}$ which describes the resonant frequency of a circuit employing an inductor and a capacitor. In this relationship, "f" is the resonant frequency, "L" is the inductance of an inductive element such as probe receive/transmit coil 304A, and "C" is the capacitance of moisture sensing capacitor 312. The inductance "L" is a consequence of construction of probes 300A and 300B and typically has a fixed value. Thus, the resonant frequency "f" of the electronic circuit 303 employed in probe 300A is determined primarily by the capacitance "C" of moisture sensing capacitor 312. In similar fashion, the resonant frequency of VFO 320 of electronic circuit 303 of probe 300B, is a function of the capacitance "C" of moisture sensing capacitor 312. As previously discussed, "C" varies with the moisture level in the dielectric of moisture sensing capacitor 312 and is thus analogous to the moisture content of soil 402.

It will be appreciated from the aforementioned relationship that the respective resonant frequencies of the respective electronic circuits 303 employed in probe 300A and probe 300B are likewise analogous to the moisture level in the dielectric, and, accordingly, to the moisture content of soil 402. Because data signal 302 is transmitted at the resonant frequency of the circuit which includes moisture sensing capacitor 312 (FIGS. 2B and 2C), the frequency of data signal 302 is likewise analogous to the moisture content of soil 402. Although, in the case of probe 300A, the frequency of data signal 302 may be substantially different from that of excitation signal 202, the frequency of data signal 302 nevertheless is analogous to the moisture content of soil 402. Note that in a preferred embodiment, probe 300 measures the real component of the dielectric constant of hydrophilic dielectric 320 so as to prevent probe 300 from being sensitive to soil 402 conductivity.

Note further that it is also possible to measure the soil matrix water potential in a similar fashion. For this measurement, moisture sensing capacitor 312 is prepared with a dielectric characterized by a known relationship between water content and water potential. When such a dielectric is in contact with the soil for a period of time, the potential of the dielectric will become equal with that of the surrounding soil. Consequently, the water potential of the soil can be determined by employing the measured capacitance in the known relationship between water potential and water content.

Figure 3A:
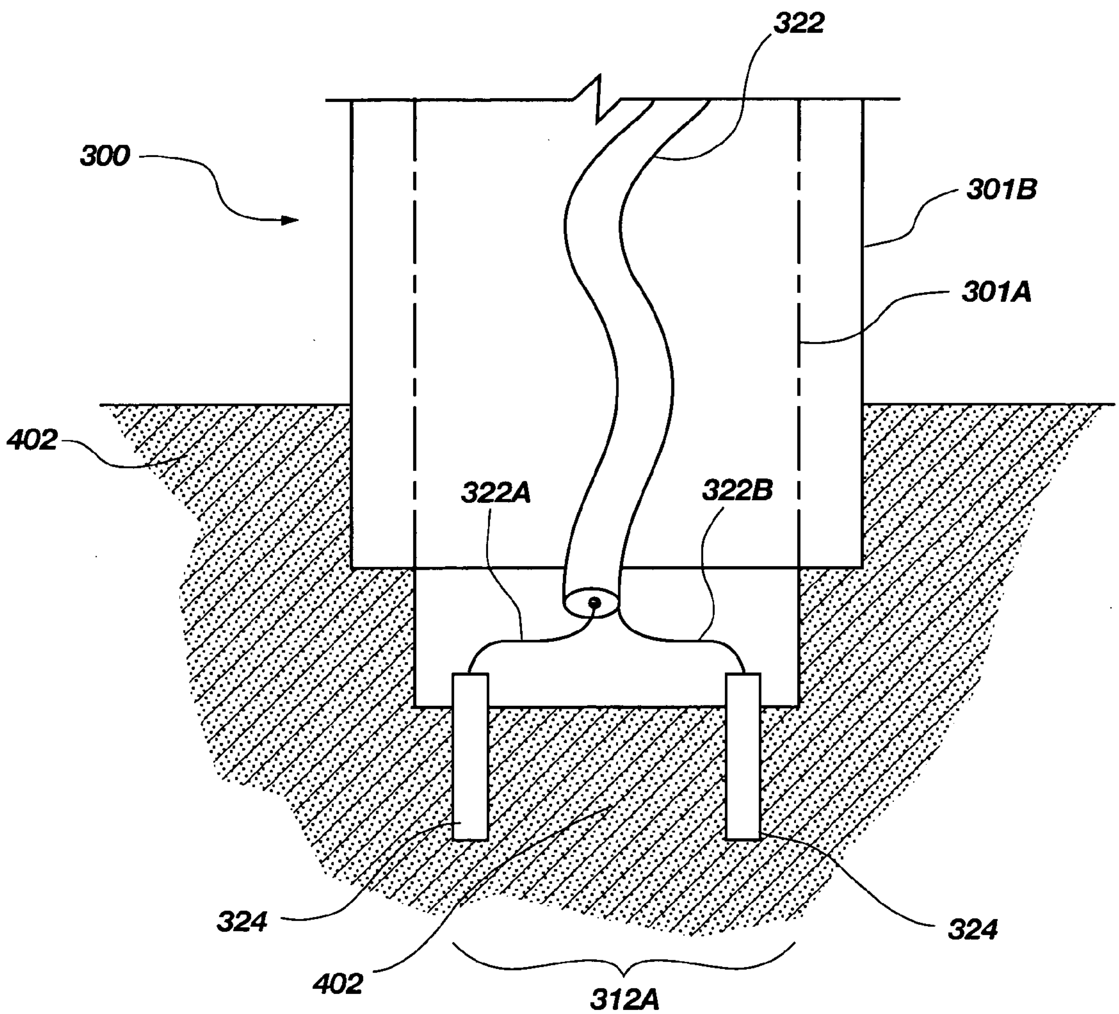
FIG. 3A depicts one embodiment of a moisture sensitive capacitor.
Figure 3B:
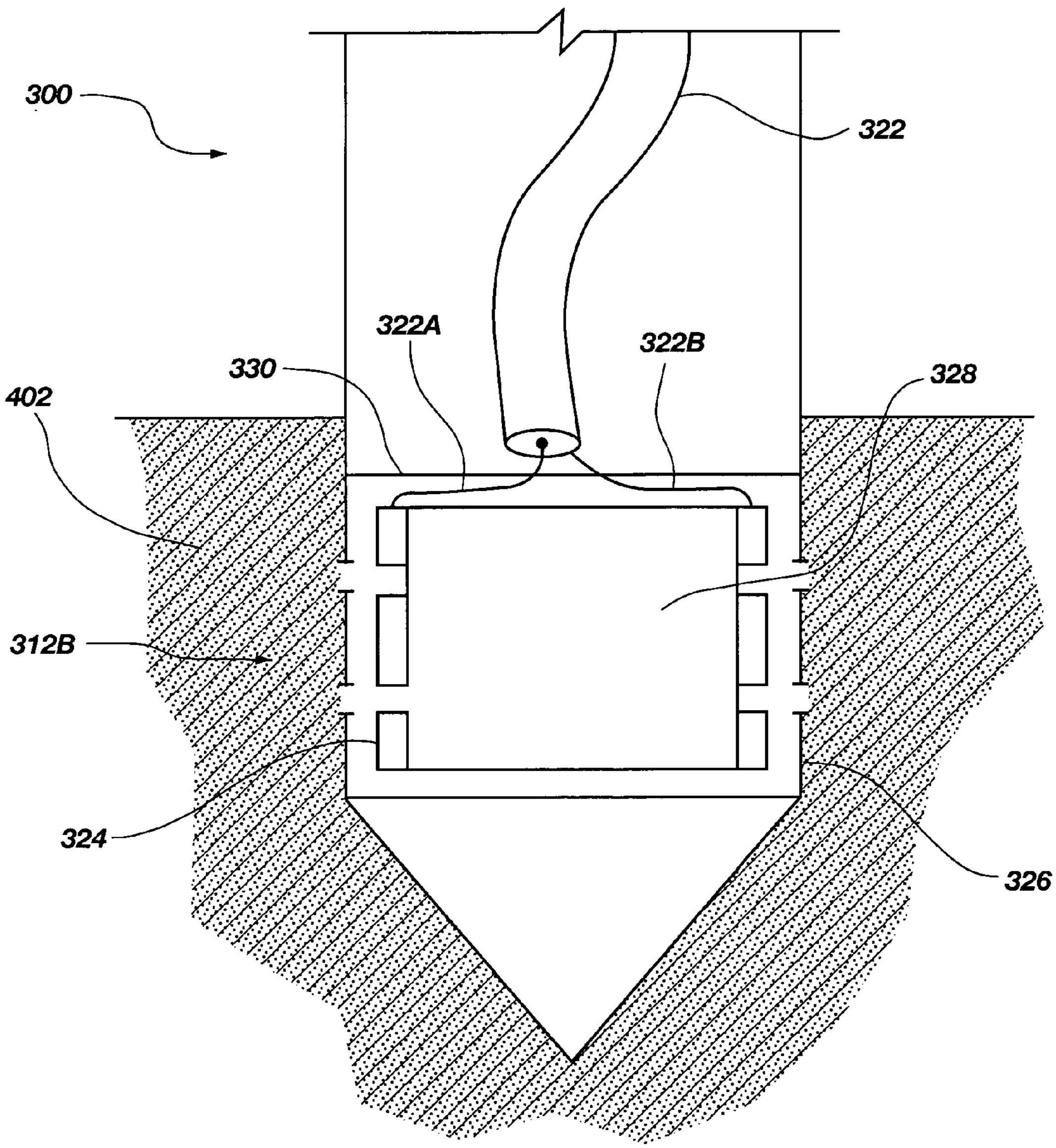
FIG. 3B depicts an alternative embodiment of a moisture sensitive capacitor.
Figure 3C:
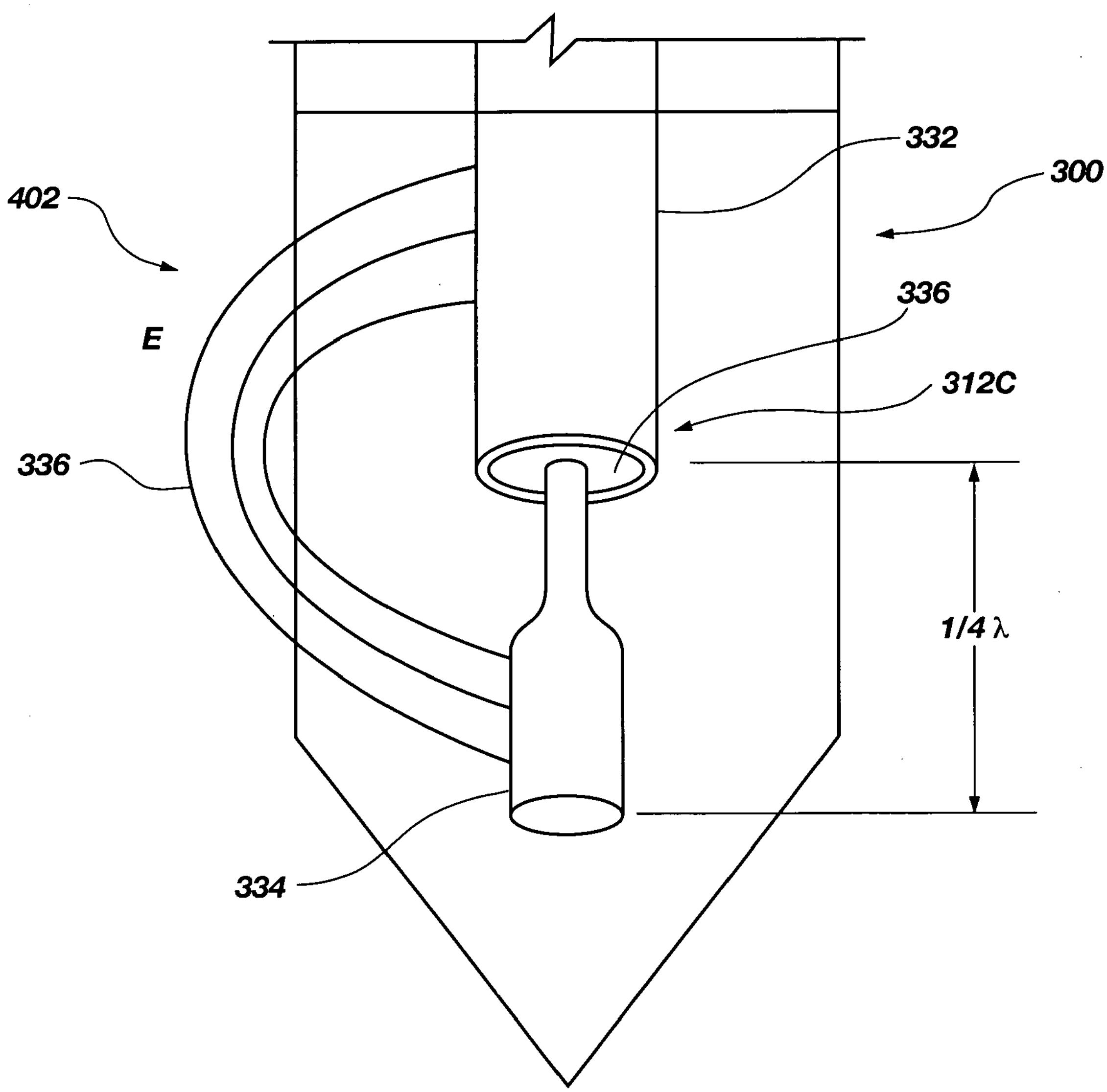
FIG. 3C depicts yet another alternative embodiment of a moisture sensitive capacitor.

With the foregoing principles in view, attention is directed now to the details regarding the structure and operation of various embodiments of moisture sensing capacitor 312, depicted in FIGS. 3A through 3C. One such embodiment is indicated generally in FIG. 3A as 312A. As suggested in FIG. 3A, probe 300 includes a shielded wire 322 ultimately connected to system processor 308 (not shown) and having a first conductor 322A and a second conductor 322B. Body 301A of probe 300 is electrically isolated from shielded wire 322 by way of insulation or the like. Moisture sensing capacitor 312A includes two capacitor plates 324, one capacitor plate 324 being connected to first conductor 322A and one capacitor plate 324 being connected to second conductor 322B. When probe 300 is placed in the ground, soil 402 is thereby forced between capacitor plates 324 and thus serves as the dielectric of moisture sensing capacitor 312A. It will be appreciated that the materials, geometry, and/or arrangement of capacitor plates 324 may be varied, either alone or in combination, as required to achieve a desired result.

In operation, changes to the moisture content of soil 402 disposed between capacitor plates 324 will cause the dielectric constant "C" of soil 402 to vary. As discussed above, variations in dielectric constant affect the capacitance of a capacitor. Thus, the level of current produced when moisture sensing capacitor 312A discharges is analogous to the moisture content of soil 402. As discussed elsewhere herein, the specific manner in which the output current, or signal, from moisture sensing capacitor 312A is utilized depends on whether or not moisture sensing capacitor 312A is employed in conjunction with digital electronics or analog electronics.

In some situations, the properties of soil 402 are so variable that its use as a dielectric could compromise the effectiveness of moisture sensing capacitor 312A. Such would be the case, for example, where the conductivity of soil 402 varies due to changes in ion content. An alternative to moisture sensing capacitor 312A is required in these situations.

With reference now to FIG. 3B, an alternative embodiment of a moisture sensing capacitor is indicated generally as 312B. As suggested in FIG. 3B, probe 300 includes a shielded wire 322 ultimately connected to system processor 308 (not shown) and having a first conductor 322A and a second conductor 322B. Body 301 of probe 300 is electrically isolated from shielded wire 322 by way of insulation or the like. Moisture sensing capacitor 312A includes two capacitor plates 324, one capacitor plate 324 being connected to first conductor 322A and one capacitor plate 324 being connected to second conductor 322B.

As further suggested in FIG. 3B, capacitor plates 324 are disposed in a portion of probe 300 having a screen 326 or the like so as to permit moisture exchange between soil 402 and dielectric 328 of moisture sensing capacitor 312B. Such an arrangement is particularly desirable where the properties of soil 402 are such that they would interfere the moisture measurement. Note that the present invention contemplates as within its scope any other device or arrangement that will facilitate the aforementioned moisture exchange, including, but not limited to, perforated materials such as metals, plastics, and the like.

With continuing reference to FIG. 3B, dielectric 328 comprises a hydrophilic material, preferably ceramic or the like, and thus absorbs a level of moisture consistent with that of soil 402 with which it is communication. Capacitor plates 324 are preferably perforated so as to facilitate movement of moisture between soil 402 and dielectric 328. Changes to the capacitance of moisture sensing capacitor 312B result from moisture exchange between soil 402 and dielectric 328, so that soil 402 moisture content data can be acquired by energizing, and then discharging, moisture sensing capacitor 312B, as described elsewhere herein. Note that the material for dielectric 328 may be chosen for particular properties or characteristics, wherein such properties and characteristics include, but are not limited to, water retention curve, or dielectric loss.

It will accordingly be appreciated that the aforementioned methods and devices can also be used to determine soil matrix water potential since the water potential of the soil equilibrates with that of the dielectric. Since, as suggested earlier, the relationship of the dielectric water potential to water content is known, or can be determined, this allows conversion of dielectric water content to soil water potential.

It will be appreciated that the materials, geometry, and/or arrangement of capacitor plates 324 may be varied, either alone or in combination, as required to achieve a desired result. Finally, a preferred embodiment of probe 300 further includes a moisture barrier 330 which prevents moisture from coming into contact with shielded wire 322.

Directing attention now to FIG. 3C, yet another alternative embodiment of a moisture sensing capacitor is indicated generally as 312C. As suggested in FIG. 3C, moisture sensing capacitor 312C includes a shield 332 and a center conductor 334 disposed in an electrically insulated portion of probe 300. Shield 332 and center conductor 334 have an insulator 336 disposed therebetween so as to substantially prevent electrical communication between shield 322 and center conductor 334. Center conductor 334 extends a predetermined distance beyond shield 332. Such construction causes electrical field lines 336 of electrical field E to extend into soil 402, as indicated in FIG. 3C. As is the case with the embodiments of moisture sensing capacitor 312 depicted in FIGS. 3A and 3B, the medium through which the electrical field lines 336 pass, i.e., soil 402, determines the capacitance “C” of moisture sensing capacitor 312C. Thus, while the geometry and arrangement of the elements of moisture sensing capacitor 312C are somewhat different than that depicted in FIGS. 3A and 3B, the operational principles are identical, so that as the moisture level in soil 402 varies, the capacitance of moisture sensing capacitor 312C varies in the manner, and with the resultant effects, described elsewhere herein.

Preferably, the capacitance measurement, and thus the measurement of the moisture content of soil 402, is made at an RF frequency for which shield 332 and center conductor 334 form a resonant circuit. Such a resonant circuit may be achieved, for example, by constructing and/or arranging shield 332 and center conductor 334 so that the end of center conductor 334 extends outward from shield 332 an electrical distance equal to approximately one quarter (¼) of the wavelength “λ” of the RF frequency, as indicated in FIG. 3C. Such an arrangement has the desirable effect of maximizing the potential, or voltage, between center conductor 334 and shield 332 at that point of center conduct 334 most remote from shield 332, i.e., at the tip of center conductor 334. Consequently, electrical field lines 336 are forced out into soil 402. This arrangement thus serves to maximize the sensitivity of moisture sensing capacitor 312C to moisture in soil 402, and thereby enhance the performance of moisture sensing capacitor 312C. Finally, this arrangement also provides a way to produce substantial probing of soil 402, by electrical field lines, with a sensor that is effectively one-dimensional (i.e., long and thin. Such a geometry and arrangement accordingly permits relatively quick and ready deployment of probe 300 in holes without requiring the careful arrangement of the soil around the conducting elements of the capacitor. Note that both shield 332 and center conductor 334 may be coiled so as to form inductors of relatively increased electrical length, without requiring a physical lengthening of probe 300. Such a coiled arrangement also has the benefit of permitting the “Q” of the circuit to be increased for high electrical potential in probe 300 even in the presence of electrically dissipative soil properties.

Directing attention now to FIG. 4A, an embodiment of a reader 200 is depicted in block diagram form. In general, the electronics of reader 200 are preferably digital and include a power circuit (generally indicated in phantom lines) and a signal processing and transmission circuit (generally indicated in solid lines). However, the two circuits may in some instances be interconnected so that the portion of the circuit represented by a particular solid line or phantom line in FIG. 4A may, at different instances, serve to transmit power as well as facilitate signal processing and transmission.

Reader 200 includes a reader transmit/receive antenna 204 having a capacitor 205. Preferably, reader transmit/receive antenna 204 comprises a tuned circuit, antenna, i.e., a resonant antenna, or the like. As previously discussed, reader transmit/receive antenna 204 facilitates formation of an inductive couple between reader 200 and probe transmit/receive antenna 304 of probe 300, the inductive couple permitting reader 200 and probe 300 to exchange data, and permitting reader 200 to provide energy, in the form of excitation signal 202, to probe 300. Note that in an alternative embodiment, production and transmission of excitation signal 202 is performed by one or more components distinct and separate from reader 200.

Reader 200 additionally includes an input signal demodulator 206 in communication with reader transmit/receive antenna 204, a system processor 208 and an output signal modulator and excitation wave driver 210. System processor 208 includes an input 208A, to which input signal demodulator 206 is connected, an output 208B, to which output signal modulator and excitation wave driver 210 is connected, and a data storage element 208C.

Preferably, input signal demodulator 206 and output signal modulator and excitation wave driver 210 are adapted for, respectively, frequency demodulation and modulation (FM). However, alternative embodiments are contemplated wherein input signal demodulator 206 and output signal modulator and excitation wave driver 210 are adapted for, respectively, amplitude demodulation and modulation (AM). The present invention also contemplates as within its scope input signal demodulators 206 and output signal modulator and excitation wave drivers 210 adapted for, respectively, phase demodulation and modulation. Finally it will be appreciated that input signal demodulators 206 and output signal modulator and excitation wave drivers 210 may be employed that utilize various combinations of different types of demodulation and modulation, respectively.

Power for input signal demodulator 206, output signal modulator and excitation wave driver 210, and system processor 208 is provided by power source 212. The power provided by power source 212 is conditioned and regulated as necessary by power conditioner/regulator 214.

In operation, power from power source 212 energizes system processor 208 causing system processor 208 to produce a digital carrier signal. The digital carrier signal thus produced is then modulated by output signal modulator and excitation wave driver 210, so as to form data component 202A of excitation signal 202 for transmission to probe 300. Excitation signal 202, preferably comprising data component 202A and energy component 202B, is then transmitted from reader 200 to probe 300 by way of reader transmit/receive antenna 204, wherein output signal modulator and excitation wave driver 210 provides the drive to antenna 204 for transmission of energy component 202B.

In response to transmission of excitation signal 202 by reader 200, probe 300 sends data signal 302, in the manner disclosed elsewhere herein, back to reader 200. Preferably, data signal 302 is an FM digital signal, but in other alternatives may take the form of an AM digital signal, or a phase shifted signal, as discussed elsewhere herein. After data signal 302 is received at reader transmit/receive antenna 204, data signal 302 is passed to input signal demodulator 206 which then demodulates data signal 302 so as to extract the digital data from probe 300 for use by system processor 208. In a preferred embodiment, the digital data from probe 300 comprises moisture content data. After data signal 302 from probe 300 has been demodulated, the digital data from probe 300 is stored in data storage element 208C of system processor 208. In a preferred embodiment, the digital data acquired from probe(s) 300 is employed for real-time control of a system in operative communication with the reader, such as an agricultural irrigation system.

Finally, a preferred embodiment of system processor 208 includes data link capability so that the digital data stored in reader 200 may be accessed and downloaded from one or more remote sites 600, for processing, manipulation, and/or analysis. Such downloading may occur either automatically based on criteria such as a predetermined time interval, or manually upon request from the remote site.

Turning now to FIG. 4B, an embodiment of a reader employing analog circuitry is indicated generally as 200A. Reader 200A includes a pulse forming network 203 coupled with transmit/receive antenna 304. Pulse forming network 203 forms pulses of excitation signal 202, that are transmitted by transmit/receive antenna 204 to probe 300. In one embodiment, excitation signal 202 comprises radio frequency (RF) energy, or the like. Preferably, reader 200A operates in about a 100 megahertz (mhz) frequency range.

As suggested earlier, reader 200 can be used in conjunction with different embodiments of probe 300. Note that, in general, a reader 200 employing digital electronics is preferably employed with probes 300 employing digital electronics. Likewise, a reader 200 employing analog electronics is preferably used in conjunction with probes 300 having analog electronics.

Figure 2C:
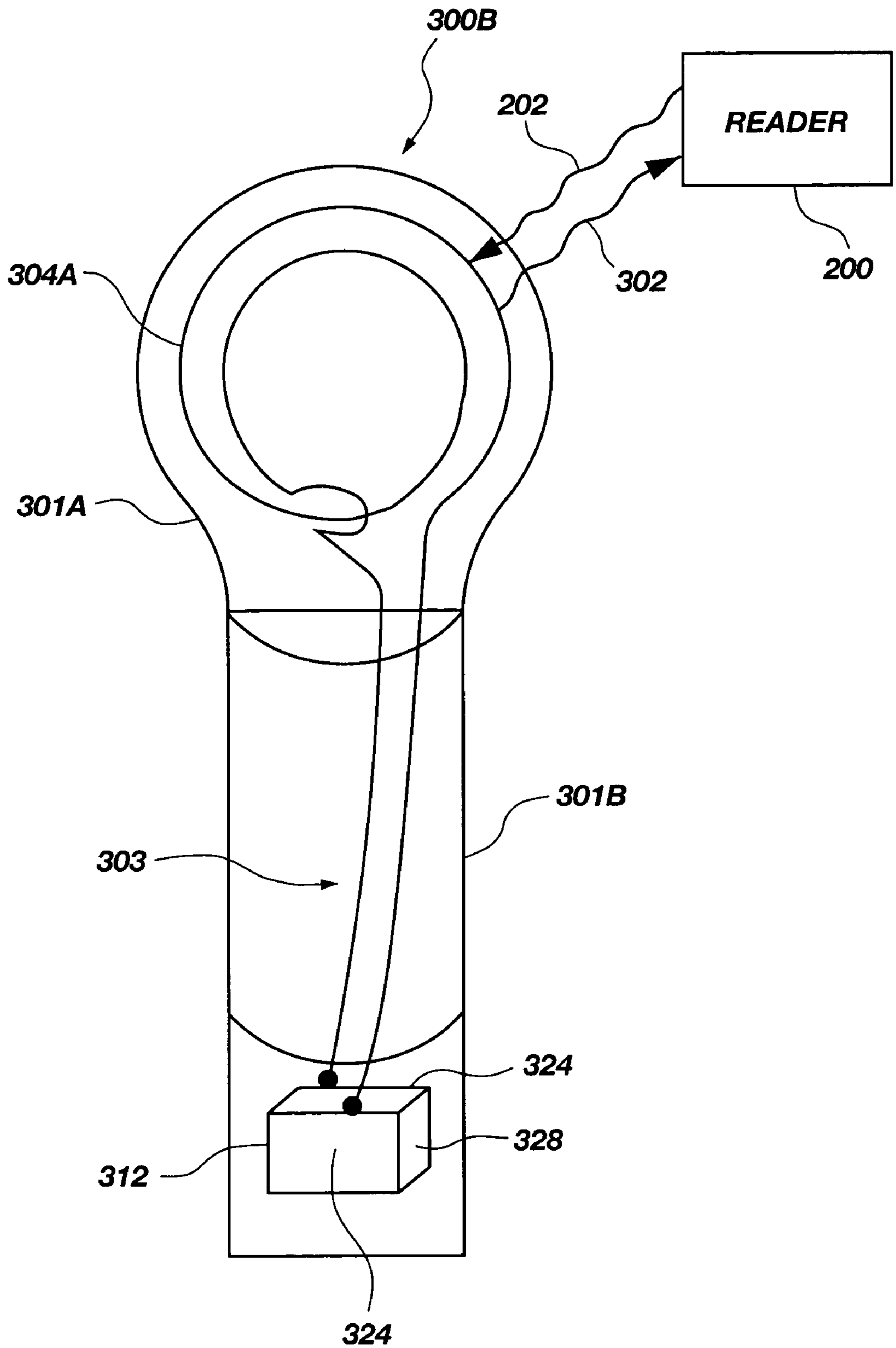
FIG. 2C is a block diagram of an embodiment of a passive style probe employing analog electronics, and indicating relationships among various elements of the probe.

In view of the foregoing, reader 200A is preferably used in conjunction with probes 300A (FIG. 2B) or 300B (FIG. 2C). When used in conjunction with probe 300B, reader 200A further includes, in addition to the aforementioned components, blocking circuitry 206, as shown in FIG. 4B. In operation, blocking circuitry 206 prevents transmit/receive antennae 204 from receiving its own transmissions when it is in 'transmit' mode. This is an important feature in view of the fact that when reader 200A is used in conjunction with the embodiment of probe 300 indicated in FIG. 2C, transmission of excitation signal 202 from reader 200A and reception of data signal 302 by reader 200A occur at substantially the same frequency and the time lag between transmission and subsequent reception is very short. Without blocking circuitry 206, reader 200 could misread its own transmissions as being transmissions from probe 300.

If reader 200A is used in conjunction with probe 300A (FIG. 2B), blocking circuitry 206 is not required because, as previously discussed, reader 200A transmits at a substantially different frequency than the frequency of data signal 302 transmitted by probe 300A. Furthermore, there is a time lag between the transmit and receive cycles, and thus minimal likelihood that reader 200A would misread its own transmission as being that of probe 300A.

With continuing reference to FIG. 4B, probe 300A (or 300B) transmits data signal 302 which is then received by transmit/receive antenna 304 of reader 200A. Analog-to-digital converter 209 of reader 200A captures the waveform of data signal 302 in memory 210. Software 211 then causes processor 212 to determine the frequency of the waveform of data signal 302 and converts the frequency to moisture content.

Finally, note that in an alternative embodiment, transmit/receive antenna 204 is in communication with, but located remotely from, pulse forming network 203, blocking circuitry 206 (where required), analog-to-digital converter 208, memory 210, and processor 212.

It will be appreciated that moisture sensor 100 may be profitably employed in a wide variety of applications and for a variety of purposes. For example, the present invention could be configured to measure and report on a wide variety of parameters of various media of interest, wherein such parameters include, but are not limited to, temperature, pressure, voltage, power, current, intensity, wavelength, stress, strain, and pH, and wherein such media include, but are not limited to, liquids (including, but not limited to, water), as well as liquids in combination with solids and/or gases, and thus use of the present invention is not limited solely to agricultural applications, or necessarily to the detection and measurement of moisture content.

In one application contemplated by the present invention, moisture sensor 100 may be employed to measure water content over a large area for environmental, rather than agricultural purposes, such as in the case of a watershed. In yet another exemplary application of the teachings of the present invention, the moisture content of landfill caps could be monitored in order to facilitate estimates of how much water, or other liquids, will penetrate the cap and thereby lead to potential runoff and pollution problems. In this application, a plurality of probes 300 are disposed throughout a landfill or other site of interest, each of the probes 300 being situated inside a durable structure such as polyvinyl chloride tubing or the like. A portable version of reader 200 is then transported throughout the landfill or site of interest so as to facilitate acquisition of moisture data, or other data, from each probe 300.

Finally, the present invention could be profitably employed in the context of various manufacturing or production processes. For example, a plurality of probes 300 could be disposed in a process fluid and a reader 200 situated near the path of the process fluid. Reader 200 would then cause passing probes 300 to acquire and transmit data of interest regarding the process fluid to reader 200. The data thus acquired could then be processed and utilized as required.

Figure 5:
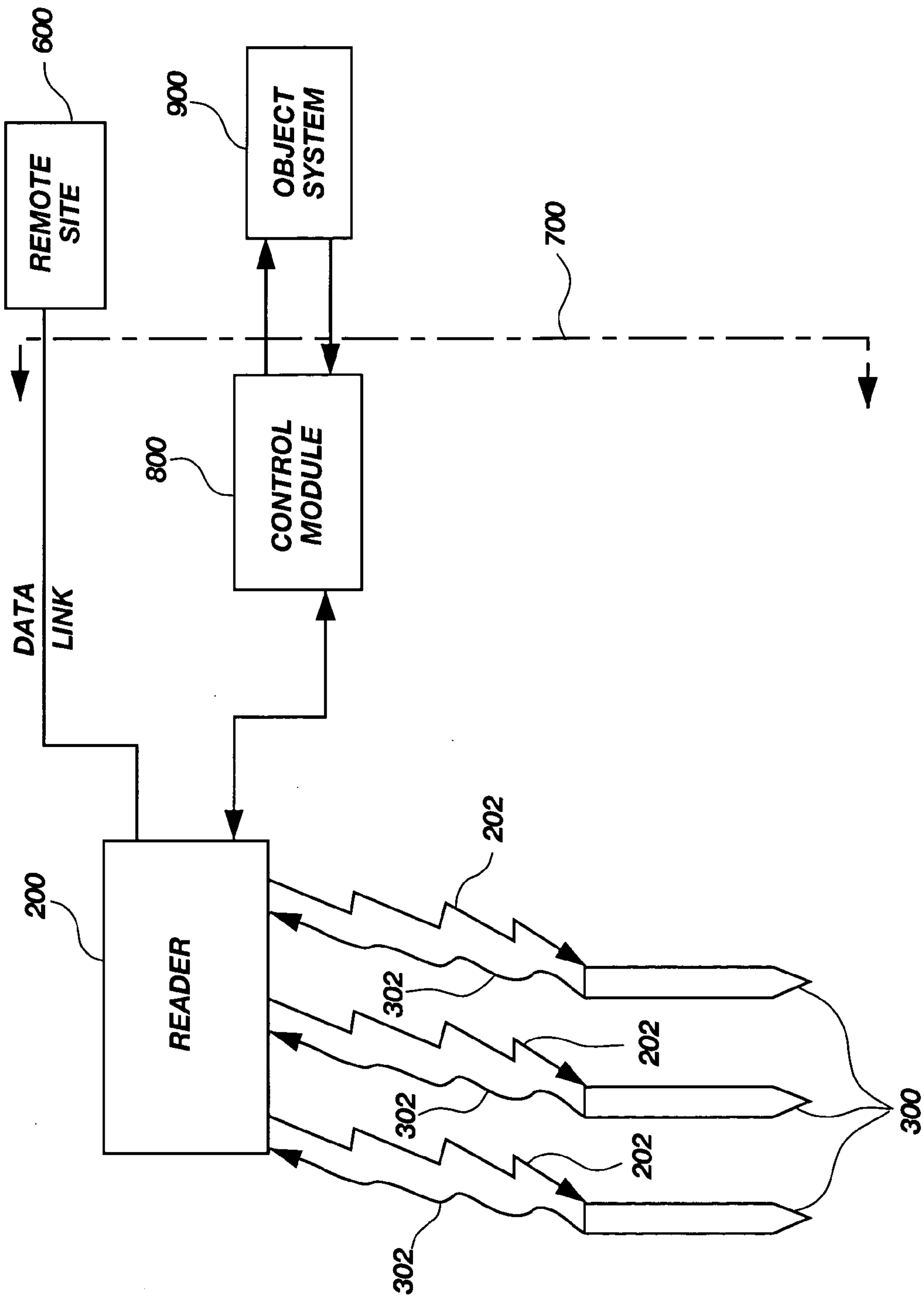
FIG. 5 depicts an embodiment of a data-acquisition-and-telemetry-based control system.

As suggested elsewhere herein, the present invention is not limited solely to acquiring and processing data. In particular, the present invention contemplates as within its scope, among other things, data acquisition and telemetry for use in facilitating substantially real-time control of one or more systems. The Data Acquisition and Telemetry Control System (DATCS) 700, indicated in FIG. 5 is one example of an embodiment of such functionality. DATCS 700 includes a reader 200, a plurality of probes 300, and control module 800. DATCS 700 is in operable communication with the system, or systems, to be controlled, i.e., object system 900. The operation of DATCS 700 is described in detail below.

Note that because the structure and operation of reader 200 and probes 300 are discussed in detail elsewhere herein, no additional discussion thereof is provided at this juncture. It will be appreciated however, that the features, advantages, operational details, and functionality, disclosed herein, of various embodiments of reader 200 and probes 300 are equally germane in the context of the structure and operation of DATCS 700.

In operation, reader 200 and probes 300 pass within a predetermined distance of each other so as to facilitate the data acquisition, transmission, and reception processes described elsewhere herein. Note that this invention contemplates as within its scope a variety of arrangements of reader 200 and probes 300 that are effective to facilitate the data acquisition, transmission, and reception processes. Such arrangements include, but are not limited to, those wherein probes 300 move relative to reader 200, and likewise, arrangements wherein reader 200 moves relative to probes 300.

The data acquired by probes 300 and transmitted to reader 200 is evaluated by reader 200 and used to generate one or more sets of instructions corresponding to the acquired data. Alternatively, the data collected by reader 200 is evaluated at remote site 600. Remote sites 600 contemplated by the present invention include, but are not limited to, a website on a global computer network. In particular, that data may, as discussed above, be downloaded to one or more remote sites 600, by way of a data link between remote site 600 and reader 200, for processing, manipulation, and/or analysis, wherein such processing, manipulation, and/or analysis include, but are not limited to, generation of a set of instructions corresponding to the data. Such downloading may occur either automatically based on criteria such as a predetermined time interval, or manually upon request from remote site 600. Note that the data acquired by probes 300 may relate to any number of parameters reflecting the environment in which the probes 300 are disposed, including, but not limited to, pressure, temperature, moisture, voltage, power, current, intensity, wavelength, stress, strain, pH, chemical content/composition, humidity, or the like.

The instructions generated by reader 200 are then passed from reader 200 to control module 800. In the event the instructions are generated at remote site 600, they are preferably returned to reader 200 and thence to control module 800, but could alternatively be transmitted directly to control module 800. It will be appreciated that a wide variety of processing, manipulation, and analyses may be performed with respect to the data gathered from probes 300, whether on-location at the site of DATCS 700, or remotely at remote site 600. Accordingly, any data processing, manipulation and/or analyses facilitating the functionality, disclosed herein, of DATCS 700, is contemplated as being within the scope of the present invention.

Upon receipt of instructions from reader 200, control module 800 translates the instructions into one or more control signals which are then transmitted to object system 900, thereby causing object system 900 to perform the desired action(s). In one embodiment, control module 800 and object system 900 are linked by a feedback loop so that control module 800 is readily able to monitor the performance of object system 900, and, if necessary, make adjustments to the operation of object system 900.

In a preferred embodiment, DATCS 700 operates substantially continuously in conjunction with object system 900. As a result of operation in this way, DATCS 700 has the desirable feature of permitting, and effectuating, substantially real-time control of the operation of object system 900. Note that as contemplated herein "real-time control" refers to the capability of DATCS 700 to impose changes on the operation of object system 900 substantially simultaneously with receipt by reader 200 of data gathered by probes 300. Because of this feature, and others enumerated herein, DATCS 700 is well-suited for a wide variety of applications. One possible application concerns agricultural irrigation.

Figure 6:
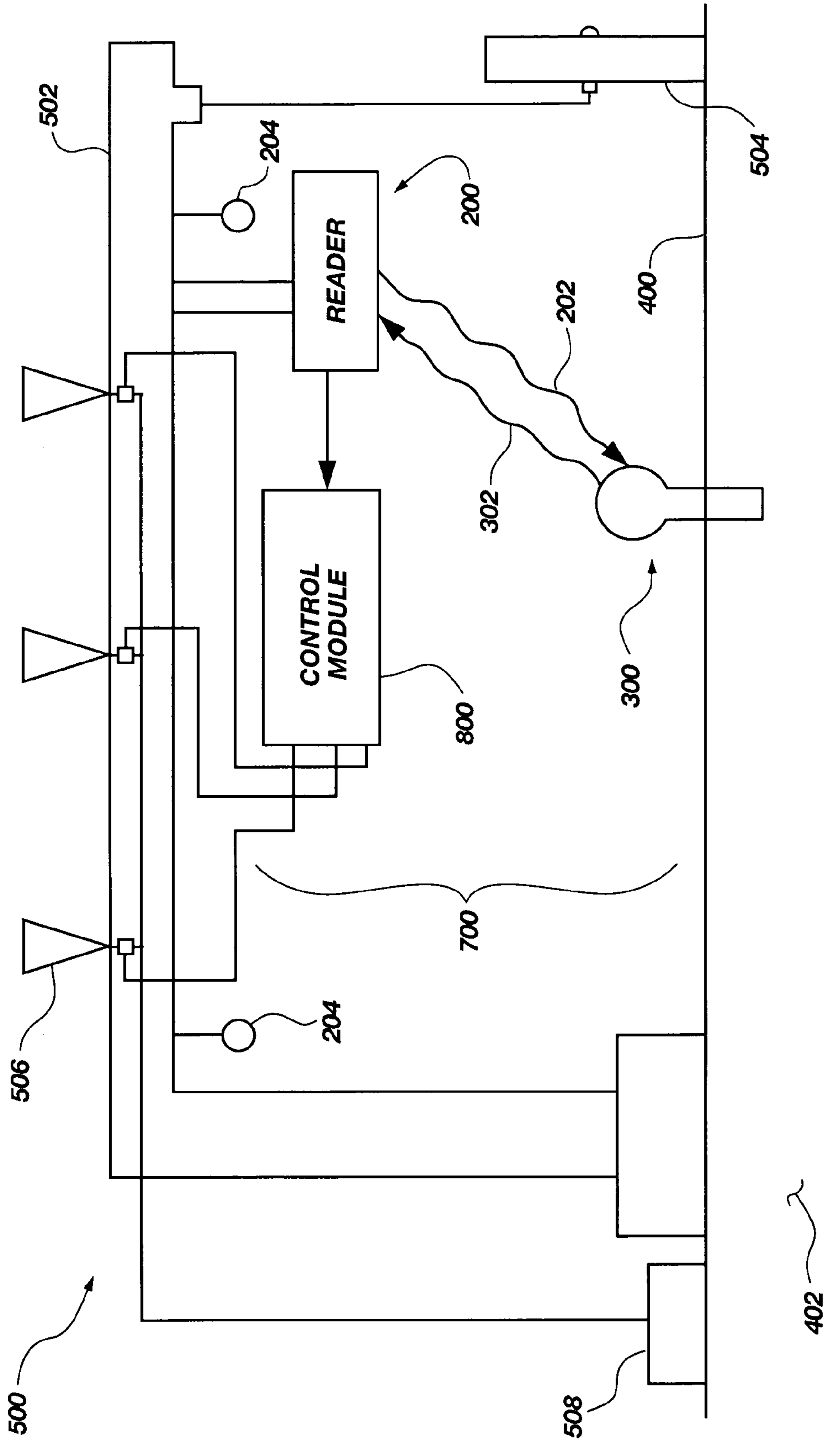
FIG. 6 depicts use of a data-acquisition-and-telemetry-based control system in an agricultural application.

As suggested in FIG. 6, DATCS 700 may be employed with a center-pivot irrigation system 500. It is also contemplated however, that the present invention could be used in conjunction with a wide variety of other irrigation system types including, but not limited to, linear move irrigation systems or the like. Note that center-pivot irrigation system 500 is but one embodiment of an object system 900 whose operation may be controlled by DATCS 700.

In the application depicted in FIG. 6, a plurality of probes 300 are disposed in soil 402 of agricultural field 400. It will be appreciated that the number and/or placement of probes may be varied as required to suit a particular application and/or to achieve one or more desired results. Center-pivot irrigation system 500 includes a mobile irrigation structure 502 having a plurality of pivot wheels 504 or the like so as to facilitate movement of mobile irrigation structure 502 over the surface of agricultural field 400. Reader 200 is preferably attached to mobile irrigation structure 502 so that it moves over the surface of agricultural field 400 in conjunction with mobile irrigation structure 502.

It will be appreciated that a variety of means may be profitably employed to perform the reader 200 transportation function of mobile irrigation structure 502. Mobile irrigation structure 502 is but one example of a means for transporting reader 200 throughout the zone of interest, in this case, agricultural field 400. Thus, the structure disclosed herein simply represents one embodiment of structure capable of performing this function. It should accordingly be understood that this structure is presented solely by way of example and should not be construed as limiting the present invention in any way. An alternate example of means for transporting reader 300 throughout the zone of interest comprises vehicles such as tractors and the like.

Reader 200 preferably includes a plurality of transmit/receive antennae 204 located at various radii along mobile irrigation structure 502 so as to ensure that all probes 300 disposed in agricultural field 400 will, at some point, be able to communicate moisture content data to reader 200. Note that the same functionality could alternatively be achieved by adapting reader 200 for linear motion along mobile irrigation structure 502.

Center pivot irrigation system 500 further includes a plurality of nozzles 506 disposed at various locations on mobile irrigation structure 502 and being capable of fluid communication with water source 508. Preferably, nozzles 506 are individually controllable so that water flow through each nozzle 506 can be individually regulated. A control module 800 is in operative communication with reader 200 and nozzles 506.

As center pivot irrigation system 500 moves across agricultural field 400, reader 200 gathers moisture content data from each probe 300, in the manner described elsewhere herein. Note that the present invention contemplates that moisture content, or other, data may be gathered from more than one probe 300 at any given time. Reader 200 uses the moisture content data thus gathered to generate a set of watering instructions for control module 800. It will be appreciated that the watering instructions may be generated at remote site 600 (not shown) from reader 200, and then returned to reader 200 for passage to control module 800, or alternatively, may be passed directly from remote site 600 (not shown) to control module 800.

The aforementioned watering instructions include, but are not limited to, the volume of water to be dispersed, the time(s) when water dispersal is to begin, the length of time for which the required flow rate must be maintained, and/or the location(s) at which the water is to be dispersed. The watering instructions thus generated are passed to control module 800 which, in turn, transmits one or more corresponding signals to one or more nozzles 506, so as to control the flow of water from water source 508 through nozzles 506 in a manner consistent with the instructions received from reader 200.

It will be appreciated from the foregoing discussion that one valuable feature of the present invention is that it maximizes the efficiency with which water is dispersed on an agricultural field. Because the irrigation system is controlled by way of the real-time moisture content data, water flow can be regulated for optimal dispersion on the field, thereby substantially minimizing wasted water, and significantly reducing water expenses. These are particularly valuable features in areas where water is at a premium and is expensive to obtain.

In a preferred embodiment, reader 200 has stored therein predetermined moisture criteria developed for agricultural field 400, the moisture criteria including, but not limited to, the amount of moisture desired, and the area over which water is to be dispersed. Thus, the moisture content data gathered from probes 300 can be compared to the predetermined moisture criteria, and a set of corresponding watering instructions generated by reader 200 for transmission to control module 800 and implementation by nozzles 506.

As discussed above, the moisture content data collected by reader 200 can be employed to develop a set of watering instructions so as to facilitate real-time control of center-pivot irrigation system 500 by DATCS 700. However, the moisture content data thus collected has a number of other uses as well, one of which is described below.

In particular, the moisture content data collected by reader 200 can be used to facilitate development, by reader 200, or alternatively at a remote site 600, of a moisture map of agricultural field 400. The moisture map is preferably contemporaneously produced, and continuously updated, as center pivot irrigation system 500 moves through agricultural field 400. It will be appreciated that transportation of reader 200 throughout agricultural field 400 may be accomplished other than by center pivot irrigation system 500, for example, a tractor or the like would provide the necessary functionality of center pivot irrigation system 500 in this regard.

Because the moisture map is contemporaneously produced, the farmer has virtually real-time access to the moisture content of the agricultural field 400, or portions of interest thereof. It will be appreciated that maps of parameters other than moisture may be generated as well, wherein such parameters may include, but are not necessarily limited to, chemical composition of soil 402, acidity, and alkalinity.

Once the moisture map is generated, it can then be stored in reader 200, or at another site. Preferably, a plurality of moisture maps would be generated and stored so as to facilitate trend analyses and the like with regard to the moisture content of agricultural field 400. It will be appreciated that the same is likewise true with regard to maps of other parameters of agricultural field 400.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A data acquisition and telemetry system, comprising:

at least one probe configured for communication with at least one soil medium; and a reader, said reader configured for transmitting at least one excitation signal having at least an energy component to said at least one probe and including blocking circuitry for substantially preventing the at least one excitation signal from being received by the reader, said at least one probe configured for using said energy component of said excitation signal to:

generate transitory electromagnetic energy sufficient to provide power for said at least one probe to:

measure at least one moisture parameter of said at least one soil medium; and transmit at least one data signal corresponding to said at least one moisture parameter, said at least one data signal being received by said reader.

2. The data acquisition and telemetry system according to claim 1, wherein said at least one data signal comprises a digital carrier signal modulated to indicate a measured value of said at least one parameter.

3. The data acquisition and telemetry system according to claim 2, wherein said digital carrier signal is at least frequency modulated.

4. The data acquisition and telemetry system according to claim 1, wherein said at least one excitation signal comprises a modulated carrier signal.

5. The data acquisition and telemetry system according to claim 1, wherein said at least one data signal has a frequency corresponding to a measured value of said at least one parameter.

6. The data acquisition and telemetry system according to claim 1, wherein said energy component of said at least one excitation signal comprises radio frequency energy.

7. The data acquisition and telemetry system according to claim 1, wherein said at least one excitation signal and said at least one data signal have substantially different frequencies.

8. The data acquisition and telemetry system according to claim 1, wherein said at least one excitation signal and said at least one data signal have substantially equal frequencies.

9. The data acquisition and telemetry system according to claim 1, wherein said at least one moisture parameter comprises moisture content of said soil medium.

10. The data acquisition and telemetry system according to claim 1, wherein said at least one moisture parameter comprises soil matrix water potential.

11. The data acquisition and telemetry system according to claim 1, wherein said at least one probe and said reader each comprise respective means for receiving and transmitting signals, said respective means for receiving and transmitting signals cooperating with each other to establish an inductive couple between said at least one probe and said reader, said inductive couple facilitating at least transfer of data and energy between said at least one probe and said reader.

12. The data acquisition and telemetry system according to claim 11, wherein each of said respective means for receiving and transmitting signals comprises at least one transmit/receive coil.

13. The data acquisition and telemetry system according to claim 11, wherein each of said respective means for receiving and transmitting signals comprises at least one antenna.

14. The data acquisition and telemetry system according to claim 1, wherein said readier is configured to selectively transmit said at least one excitation signal.

15. The data acquisition and telemetry system according to claim 1, wherein said reader is configured to convert said at least one data signal to corresponding moisture content data.

16. The data acquisition and telemetry system according to claim 1, wherein said at least one excitation signal further comprises a data component.

17. The data acquisition and telemetry system according to claim 16, wherein said data component comprises at least one instruction for execution by said at least one probe.

18. A data-acquisition-and-telemetry control system for facilitating substantially real-time management of an object system, comprising:

at least one probe configured for communication with at least one soil medium;

a reader; and a control module, wherein, said reader is configured to transmit an excitation signal having at least an energy component to said at least one probe and substantially prevent the excitation signal from being received by the reader, said at least one probe is configured for using said energy component to generate transitory electromagnetic energy sufficient to provide power for said at least one probe to measure at least one parameter of said at least one soil medium and to transmit a data signal received by said reader, said reader is configured for generating, and then transmitting to said control module, at least one set of instructions corresponding to said data signal received from said at least one probe, said control module is configured for converting said at least one set of instructions into at least one control signal, and said control module transmitting said at least one control signal to the object system so as to cause a corresponding response by the object system.

19. The data-acquisition-and-telemetry based control system according to claim 18, wherein said excitation signal comprises a modulated carrier signal.

20. The data-acquisition-and-telemetry based control system according to claim 18, wherein said excitation signal further comprises a data component.

21. The data-acquisition-and-telemetry based control system according to claim 18, wherein said data signal comprises a modulated carrier signal.

22. The data acquisition and telemetry control system according to claim 18, wherein said at least one probe and said reader each comprise respective means for receiving and transmitting signals, said respective means for receiving and transmitting signals cooperating with each other to establish an inductive couple between said at least one probe and said reader, said inductive couple facilitating at least transfer of data and energy between said at least one probe and said reader.

23. The data acquisition and telemetry system according to claim 22, wherein each of said respective means for receiving and transmitting signals comprises at least one transmit/receive coil.

24. The data acquisition and telemetry system according to claim 22, wherein each of said respective means for receiving and transmitting signals comprises at least one resonant antenna.

25. The data acquisition and telemetry system according to claim 18, wherein said reader further comprises a data link configured for facilitating download of data obtained from said data signal to at least one remote site.

26. The data acquisition and telemetry system according to claim 25, wherein said at least one remote site comprises a website on a global computer network.

27. The data acquisition and telemetry system according to claim 18, further comprising a feedback loop between said control module and the object system, said control module operably coupled to said feedback loop at least to monitor object system responses.

28. A probe for use in conjunction with a reader to facilitate measurement of moisture content of soil, comprising:

a body; and at least one electronic circuit attached to said body and configured for operative communication with the soil, said at least one electronic circuit consisting essentially of a moisture sensing capacitor and an inductive loop, wherein an energy component of an excitation signal transmitted to the probe by the reader is sufficient to induce the at least one electronic circuit to resonate substantially near a resonant frequency of the at least one electronic circuit, the resonant frequency being a data signal transmitted to the reader indicating the moisture content of the soil.

29. The probe according to claim 28, wherein said moisture sensing capacitor has a capacitance which varies according to the moisture content of the soil so that said resonant frequency of said at least one electronic circuit is primarily determined by said capacitance of said moisture sensing capacitor operably coupled to said inductive loop.

30. The probe according to claim 28, wherein said at least one electronic circuit comprises a variable frequency oscillator, said energy component causing said variable frequency oscillator to resonate so as to produce said data signal.

31. The probe according to claim 30, wherein said variable frequency oscillator comprises at least one moisture sensing capacitor having a capacitance which varies according to the moisture content of the soil proximate to the probe so that said resonant frequency of said variable frequency oscillator is primarily determined by said capacitance of said moisture sensing capacitor.

32. The probe according to claim 28, wherein said moisture sensing capacitor comprises a hydrophilic dielectric.

33. The probe according to claim 32, wherein said hydrophilic dielectric of said moisture sensing capacitor substantially comprises said soil.

34. The probe according to claim 28, wherein said at least one electronic circuit comprises at least one moisture sensing capacitor having a capacitance which varies according to the moisture content of the soil and configured for producing a discharge signal analogous to the moisture content of the soil so as to facilitate production of said data signal.

35. A moisture mapping system for facilitating a substantially real-time determination of moisture content of a zone of interest, comprising:

at least one probe for communication with the zone of interest;

a reader for selectively transmitting an excitation signal to said at least one probe, said at least one probe configured for using an energy component of said excitation signal to measure the moisture content of the zone of interest and to transmit a corresponding data signal to said reader, said corresponding data signal indicating the moisture content of the zone of interest, said reader including blocking circuitry for substantially preventing the excitation signal from being received by the reader and configured for processing said data signal so as to determine a corresponding value of the moisture content of the zone of interest and storing said corresponding value of the moisture content of the zone of interest, said corresponding value of the moisture content of the zone of interest comprising a moisture map of the zone of interest; and means for transporting said reader throughout the zone of interest so as to place said reader in operative communication with said at least one probe.

36. The moisture mapping system according to claim 35, wherein said excitation signal and said data signal are digital, and said processing of said data signal by said reader comprises demodulation of said data signal.

37. The moisture mapping system according to claim 35, wherein said data signal has a frequency corresponding to the moisture content of the zone of interest, and said reader converts said frequency of said data signal into said corresponding value of the moisture content of the zone of interest.

38. The moisture mapping system according to claim 35, wherein said means for transporting said reader comprises an irrigation system.

39. The moisture mapping system according to claim 35, wherein said reader and said at least one probe each comprise a respective transmit/receive antenna, said respective transmit/receive antennas cooperating to facilitate formation of an inductive couple between said reader and said at least one probe, said inductive couple facilitating transfer of at least data and energy between said reader and said at least one probe.

40. A precision irrigation system for facilitating substantially real-time moisture content evaluation and irrigation of an agricultural field, comprising:

a plurality of probes for measuring moisture content in operative communication with the agricultural field;

a reader configured for transmitting an excitation signal to said plurality of probes and including blocking circuitry for substantially preventing the excitation signal from being received by the reader, said plurality of probes being structured such that an energy component of said excitation signal causes each probe that receives said excitation signal to determine moisture content of soil proximate to said each probe, respectively, and said plurality of probes being further structured such that said energy component causes said each probe to generate transitory electromagnetic energy sufficient to provide power for said each probe and transmit a data signal corresponding to said moisture content to said reader;

a mobile irrigation structure having a plurality of nozzles attached thereto, said plurality of nozzles being in fluid communication with a water source, and said mobile irrigation structure configured for transporting said reader throughout the agricultural field so as to facilitate operative communication between said reader and said plurality of probes; and a control module in operative communication with said reader and with said plurality of nozzles, said control module configured for sending at least one control signal to said plurality of nozzles so as to regulate flow of water therefrom, said control signals corresponding to moisture content data gathered by said reader from said plurality of probes.

41. The precision irrigation system according to claim 40, wherein said mobile irrigation structure comprises a center pivot irrigation system.

42. The precision irrigation system according to claim 40, wherein said mobile irrigation structure comprises a linear move irrigation system.

43. The precision irrigation system according to claim 40, wherein each of said plurality of nozzles is configured for individual control.

44. The precision irrigation system according to claim 40, wherein said excitation signal further comprises a data component, said data component carrying at least one instruction from said reader to said plurality of probes.

45. The precision irrigation system according to claim 40, wherein said excitation signal and said data signal are digital.

46. A method for facilitating substantially real-time management of an object system, comprising:

placing at least one probe in communication with a soil medium;

establishing an inductive couple between said at least one probe and a reader;

transmitting at least energy from said reader to said at least one probe by way of said inductive couple and substantially preventing the energy from being received by the reader, said energy being sufficient to provide transitory power for said at least one probe and cause said at least one probe to measure at least one parameter of said soil medium and to transmit at least a data signal to said reader by way of said inductive couple, said data signal indicating a measured value of said parameter;

processing said data signal received by said reader so as to extract at least said measured value of said parameter;

using said measured value of said parameter to generate at least one set of instructions;

translating said at least one set of instructions into at least one control signal; and transmitting said at least one control signal to the object system so as to cause at least one corresponding response by the object system.

47. The method according to claim 46, wherein establishment of said inductive couple is facilitated by transporting said reader into operative communication with said at least one probe.

48. The method according to claim 46, wherein establishment of said inductive couple is facilitated by transporting said at least one probe into operative communication with said reader.

49. The method according to claim 46, wherein at least establishing an inductive couple, transmitting at least energy from said reader, processing said data signal received by said reader, using said measured value, and translating said at least one set of instructions are performed substantially in real time.

50. The method according to claim 46, wherein establishing an inductive couple, transmitting at least energy from said reader, processing said data signal received by said reader, using said measured value, and translating said at least one set of instructions are performed substantially continuously.

51. The method according to claim 46, further comprising monitoring said at least one corresponding response by the object system.

52. The method according to claim 46, further comprising using said reader to transmit data to said at least one probe by way of said inductive couple so as to facilitate control of said at least one probe by said reader.

53. The method according to claim 46, wherein processing said data signal received by said reader comprises demodulating said data signal.

54. The method according to claim 46, wherein at least establishing an inductive couple and transmitting at least energy from said reader occur substantially simultaneously.

55. A soil moisture sensor for measuring moisture content of soil in an agricultural field, comprising:

a plurality of probes, each of said plurality of probes having an electronic circuit with a moisture sensing capacitor configured for operative communication with the soil, each said moisture sensing capacitor having a hydrophilic dielectric so that capacitance of each said moisture sensing capacitor varies so as to at least indirectly correspond to moisture content of the soil adjacent thereto, and each of said plurality of probes having a tuned circuit receive/transmit antenna; and a reader, said reader having at least one tuned circuit receive/transmit antenna selectively transmitting a digital excitation signal to each said tuned circuit receive/transmit antenna of said plurality of probes and blocking circuitry for substantially preventing the digital excitation signal from being received by the reader, said digital excitation signal cooperating with said at least one tuned circuit receive/transmit antenna of said reader and respective tuned circuit transmit/receive antennae of said plurality of probes so as to facilitate establishment of an inductive couple between said reader and said plurality of probes, said plurality of probes being structured such that an energy component of said digital excitation signal energizes at least a portion of each of respective said electronic circuits so that respective said moisture sensing capacitors each produce an analog signal corresponding to the moisture content of the adjacent soil, and respective said analog signals are converted to respective digital carrier signals and modulated so as to produce a digital data signal indicating moisture content of the adjacent soil for transmission by respective said transmit/receive antennae to to said reader.

56. A data acquisition and telemetry system, comprising:

a reader configured for transmitting at least one excitation signal having at least an energy component and receiving at least one data signal from at least one probe; and at least one probe having at least one electronic circuit configured for operative communication with the soil medium, the at least one electronic circuit consisting essentially of a moisture sensing capacitor and an inductive loop, wherein the at least one probe is configured such that the energy component of the at least one excitation signal as received by the at least one probe is sufficient to induce the at least one electronic circuit to resonate substantially near a resonant frequency of the at least one electronic circuit, the resonant frequency being the at least one data signal transmitted to the reader corresponding to at least one moisture parameter of the soil medium.

57. The data acquisition and telemetry system according to claim 56, wherein the energy component of the at least one excitation signal comprises radio frequency energy.

58. The data acquisition and telemetry system according to claim 56, wherein the at least one moisture parameter comprises moisture content of the soil medium.

59. The data acquisition and telemetry system according to claim 56, wherein the at least one moisture parameter comprises soil matrix water potential.

60. The data acquisition and telemetry system according to claim 56, wherein the at least one excitation signal is selectively transmitted by the reader.

61. The data acquisition and telemetry system according to claim 56, wherein the reader converts the at least one data signal to corresponding moisture content data.

* * * * *